US012306656B2

(12) United States Patent
Liang et al.

(10) Patent No.: US 12,306,656 B2
(45) Date of Patent: May 20, 2025

(54) BANDGAP REFERENCE GENERATION FOR MULTIPLE POWER SUPPLY DOMAINS

(71) Applicant: Skyworks Solutions, Inc., Irvine, CA (US)

(72) Inventors: Bang Li Liang, Ottawa (CA); Gregory Edward Babcock, Ottawa (CA)

(73) Assignee: Skyworks Solutions, Inc., Irvine, CA (US)

( * ) Notice: Subject to any disclaimer, the term of this patent is extended or adjusted under 35 U.S.C. 154(b) by 45 days.

(21) Appl. No.: 18/332,208

(22) Filed: Jun. 9, 2023

(65) Prior Publication Data

US 2023/0409068 A1 Dec. 21, 2023

Related U.S. Application Data

(60) Provisional application No. 63/366,706, filed on Jun. 21, 2022.

(51) Int. Cl.
*G05F 3/30* (2006.01)

(52) U.S. Cl.
CPC .................................... *G05F 3/30* (2013.01)

(58) Field of Classification Search
USPC ........................ 327/512, 513, 538–543, 530; 323/313–314
See application file for complete search history.

(56) References Cited

U.S. PATENT DOCUMENTS 6,078,210 A * 6/2000 Uchida .............. G01R 31/3004 327/540
6,531,914 B2 * 3/2003 Kawakubo .............. G05F 1/465 327/541
6,617,928 B2 9/2003 Finlay et al.
6,803,751 B2 * 10/2004 Messager ................ G05F 1/575 323/273
6,998,918 B2 2/2006 Doherty et al.
7,224,210 B2 5/2007 Garlapati et al.
7,365,589 B2 * 4/2008 Chou ........................ G05F 3/30 327/542
7,460,604 B2 12/2008 Dupuis
7,466,115 B2 * 12/2008 Biagi ........................ H03F 1/52 323/280
7,554,306 B2 6/2009 Lee et al.
8,552,794 B2 * 10/2013 Hirobe .................... G05F 3/242 327/539
9,093,969 B2 7/2015 Gebeyehu et al.
9,740,220 B2 * 8/2017 Ikeda ........................ G05F 1/56
9,837,993 B2 12/2017 Crandall
(Continued)

*Primary Examiner* — Thomas J. Hiltunen
(74) *Attorney, Agent, or Firm* — Knobbe, Martens, Olson & Bear, LLP

(57) ABSTRACT

Apparatus and methods for bandgap reference generators are disclosed. In certain embodiments, a bandgap reference generator includes a low voltage bandgap reference circuit that generates a first bandgap reference voltage, a high voltage bandgap reference circuit that generates a second bandgap reference voltage, a bandgap selector circuit that outputs the first bandgap reference voltage or the second bandgap reference voltage as a selected bandgap reference voltage based on a voltage level of the power supply voltage, and a bandgap translator circuit that generates a buffered bandgap reference voltage based on the selected bandgap reference voltage.

20 Claims, 24 Drawing Sheets

(56) References Cited

U.S. PATENT DOCUMENTS

| | | | |
|---|---|---|---|
| 9,871,512 B2 | 1/2018 | Ho | |
| 9,946,279 B1 * | 4/2018 | Dinh | G05F 1/56 |
| 9,971,377 B2 | 5/2018 | Balteanu et al. | |
| 11,281,247 B2 | 3/2022 | Liang et al. | |
| 11,316,550 B2 | 4/2022 | Liang et al. | |
| 11,327,517 B2 | 5/2022 | Liang et al. | |
| 11,392,159 B2 | 7/2022 | Liang et al. | |
| 11,671,136 B2 | 6/2023 | Liang et al. | |
| 2005/0024142 A1 | 2/2005 | Sowlati | |
| 2012/0077551 A1 | 3/2012 | Balteanu et al. | |
| 2013/0162227 A1 * | 6/2013 | Kodama | G05F 1/575 323/234 |
| 2013/0320944 A1 * | 12/2013 | Siao | G05F 1/56 323/282 |
| 2015/0349622 A1 * | 12/2015 | Lo | H02M 3/156 323/282 |
| 2015/0365112 A1 | 12/2015 | Alon et al. | |
| 2017/0133935 A1 | 5/2017 | Balteanu et al. | |
| 2022/0334606 A1 | 10/2022 | Liang | |
| 2022/0413534 A1 | 12/2022 | Liang et al. | |
| 2023/0100609 A1 | 3/2023 | Liang et al. | |

* cited by examiner

BANDGAP REFERENCE GENERATION FOR MULTIPLE POWER SUPPLY DOMAINS

CROSS-REFERENCE TO RELATED APPLICATIONS

This application claims the benefit of priority under 35 U.S.C. § 119 of U.S. Provisional Patent Application No. 63/366,706, filed Jun. 21, 2022 and titled "BANDGAP REFERENCE GENERATION FOR MULTIPLE POWER SUPPLY DOMAINS," which is herein incorporated by reference in its entirety.

BACKGROUND

Technical Field

Embodiments of the invention relate to electronic systems, and in particular, to radio frequency (RF) electronics.

Description of Related Technology

A communication system can include a transceiver, a front end, and one or more antennas for wirelessly transmitting and/or receiving signals. The front end can include low noise amplifier(s) for amplifying relatively weak signals received via the antenna(s), and power amplifier(s) for boosting signals for transmission via the antenna(s).

Examples of communication systems include, but are not limited to, mobile phones, tablets, base stations, network access points, customer-premises equipment (CPE), laptops, and wearable electronics.

SUMMARY

In certain embodiments, the present disclosure relates to a bandgap reference generator. The bandgap reference generator includes a low voltage bandgap reference circuit configured to generate a first bandgap reference voltage over a first range of a power supply voltage, a high voltage bandgap reference circuit configured to generate a second bandgap reference voltage over a second range of the power supply voltage that is greater than the first range, a bandgap selector circuit configured to output a selected bandgap reference voltage by selecting the first bandgap reference voltage or the second bandgap reference voltage based on a voltage level of the power supply voltage, and a bandgap translator circuit configured to generate a buffered bandgap reference voltage based on the selected bandgap reference voltage.

In some embodiments, the bandgap reference generator further includes a coarse bandgap reference circuit configured to generate a third bandgap reference voltage, the bandgap selector circuit further configured to compare the voltage level of the power supply voltage to the third bandgap reference voltage. According to a number of embodiments, the coarse bandgap reference circuit operates over a third range of the power supply voltage that includes the first range and the second range. In accordance with several embodiments, the third bandgap reference voltage is of a lower precision than the first bandgap reference voltage and the second bandgap reference voltage.

In various embodiments, the bandgap translator circuit is further configured to output a plurality of reference voltages by scaling the buffered bandgap reference voltage by a plurality of different scaling factors.

In some embodiments, the bandgap translator circuit is further configured to generate the buffered bandgap reference voltage to compensate for a nominal voltage difference between the first bandgap reference voltage and the second bandgap reference voltage.

In several embodiments, the bandgap selector circuit is further configured to provide the bandgap translator circuit with a mode signal indicating the selected bandgap reference voltage. According to a number of embodiments, the bandgap translator circuit includes a differential amplifier operable to control a transistor by way of a feedback loop, the mode signal operable to control an impedance of a compensation circuit to maintain stability of the feedback loop. In accordance with various embodiments, the bandgap translator circuit is configured to operate as a low dropout regulator in a first state of the mode signal, and to operate as a unity gain buffer in a second state of the mode signal.

In several embodiments, the bandgap reference generator is implemented in a front end module.

In certain embodiments, the present disclosure relates to a method of bandgap voltage generation. The method includes generating a first bandgap reference voltage over a first range of a power supply voltage using a low voltage bandgap reference circuit and generating a second bandgap reference voltage over a second range of the power supply voltage using a high voltage bandgap reference circuit, the second range greater than the first range. The method further includes outputting a selected bandgap reference voltage by selecting the first bandgap reference voltage or the second bandgap reference voltage based on a voltage level of the power supply voltage using a bandgap selector circuit, and generating a buffered bandgap reference voltage based on the selected bandgap reference voltage using a bandgap translator circuit.

In some embodiments, the method further includes generating a third bandgap reference voltage using a coarse bandgap reference circuit, and comparing the voltage level of the power supply voltage to the third bandgap reference voltage using the bandgap selector circuit. According to a number of embodiments, the coarse bandgap reference circuit operates over a third range of the power supply voltage that includes the first range and the second range. In accordance with several embodiments, the third bandgap reference voltage is of a lower precision than the first bandgap reference voltage and the second bandgap reference voltage.

In various embodiments, the method further includes scaling the buffered bandgap reference voltage to generate a plurality of reference voltages using the bandgap translator circuit.

In several embodiments, the method further includes compensating the buffered bandgap reference voltage for a nominal voltage difference between the first bandgap reference voltage and the second bandgap reference voltage using the bandgap translator circuit.

In some embodiments, the method further includes generating a mode signal indicating the selected bandgap reference voltage using the bandgap selector circuit, and providing the mode signal to the bandgap translator circuit. According to a number of embodiments, the method further includes processing the mode signal to maintain stability of a feedback loop of the bandgap translator circuit. In accordance with several embodiments, the method further includes operating the bandgap translator circuit as a low dropout regulator in a first state of the mode signal, and as a unity gain buffer in a second state of the mode signal.

In certain embodiments, the present disclosure relates to a front end module. The front end module includes a package substrate, and a semiconductor die attached to the package substrate. The semiconductor die includes a low voltage bandgap reference circuit configured to generate a first bandgap reference voltage over a first range of a power supply voltage, a high voltage bandgap reference circuit configured to generate a second bandgap reference voltage over a second range of the power supply voltage that is greater than the first range, a bandgap selector circuit configured to output a selected bandgap reference voltage by selecting the first bandgap reference voltage or the second bandgap reference voltage based on a voltage level of the power supply voltage, and a bandgap translator circuit configured to generate a buffered bandgap reference voltage based on the selected bandgap reference voltage.

In various embodiments, the semiconductor die further includes a coarse bandgap reference circuit configured to generate a third bandgap reference voltage, the bandgap selector circuit further configured to compare the voltage level of the power supply voltage to the third bandgap reference voltage. According to a number of embodiments, the coarse bandgap reference circuit operates over a third range of the power supply voltage that includes the first range and the second range. In accordance with several embodiments, the third bandgap reference voltage is of a lower precision than the first bandgap reference voltage and the second bandgap reference voltage.

In some embodiments, the bandgap translator circuit is further configured to output a plurality of reference voltages by scaling the buffered bandgap reference voltage by a plurality of different scaling factors.

In several embodiments, the bandgap translator circuit is further configured to generate the buffered bandgap reference voltage to compensate for a nominal voltage difference between the first bandgap reference voltage and the second bandgap reference voltage.

In various embodiments, the bandgap selector circuit is further configured to provide the bandgap translator circuit with a mode signal indicating the selected bandgap reference voltage. According to a number of embodiments, the bandgap translator circuit includes a differential amplifier operable to control a transistor by way of a feedback loop, the mode signal operable to control an impedance of a compensation circuit to maintain stability of the feedback loop. In accordance with several embodiments, the bandgap translator circuit is configured to operate as a low dropout regulator in a first state of the mode signal, and to operate as a unity gain buffer in a second state of the mode signal.

In some embodiments, the semiconductor die further includes a temperature detector configured to receive the buffered bandgap reference voltage.

In various embodiments, the semiconductor die further includes a power detector configured to receive the buffered bandgap reference voltage.

In several embodiments, the semiconductor die further includes a power amplifier and a bias circuit configured to bias the power amplifier, the bias circuit configured to receive the buffered bandgap reference voltage.

In some embodiments, the semiconductor die further includes a power management circuit configured to generate a regulated supply voltage, the power management circuit configured to receive the buffered bandgap reference voltage. According to a number of embodiments, the semiconductor die further includes a power amplifier that is powered by the regulated supply voltage.

BRIEF DESCRIPTION OF THE DRAWINGS

Embodiments of this disclosure will now be described, by way of non-limiting example, with reference to the accompanying drawings.

DETAILED DESCRIPTION OF CERTAIN EMBODIMENTS

Figure 1:
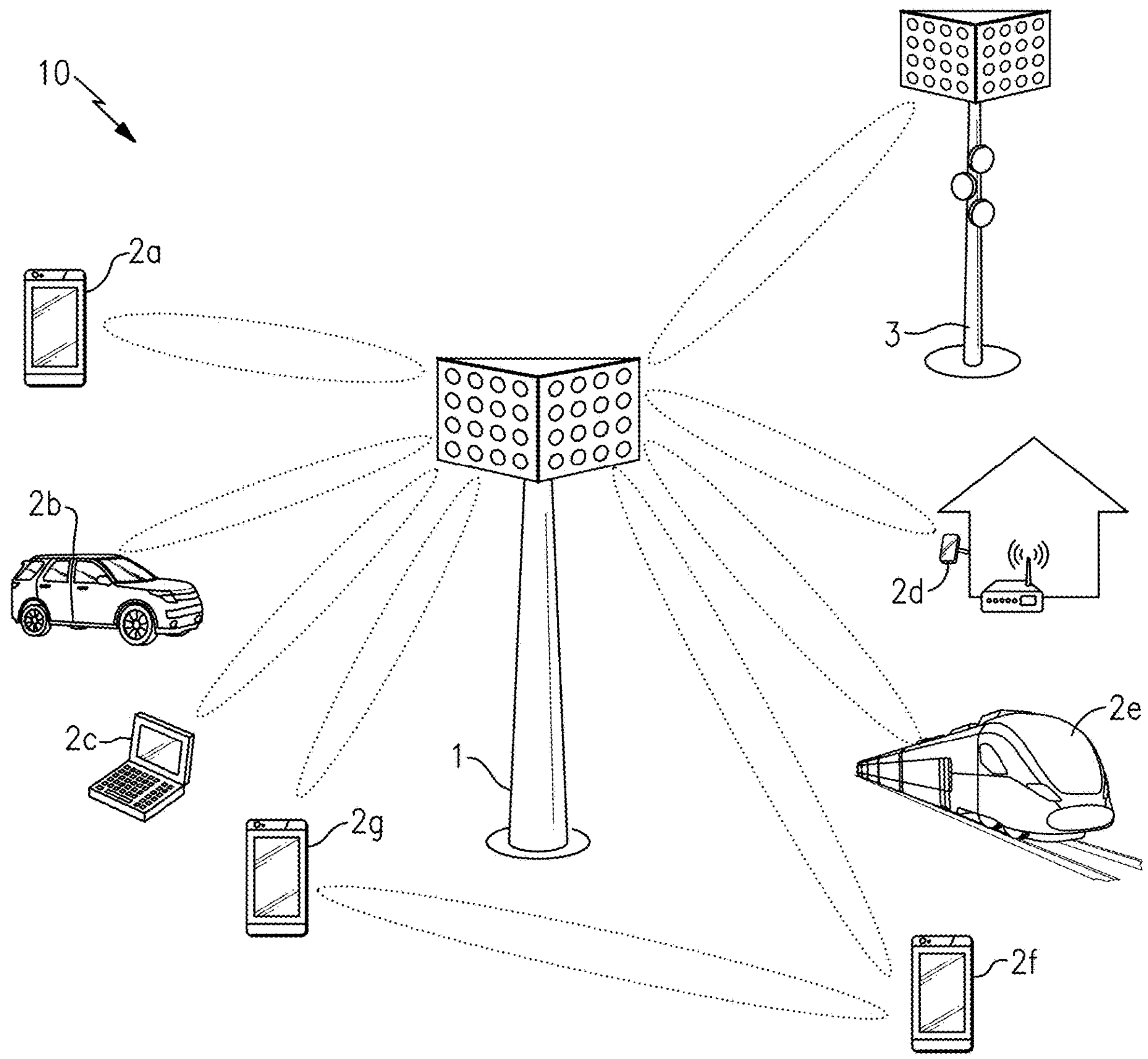
FIG. 1 is a schematic diagram of one example of a communication network.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The International Telecommunication Union (ITU) is a specialized agency of the United Nations (UN) responsible for global issues concerning information and communication technologies, including the shared global use of radio spectrum.

The 3rd Generation Partnership Project (3GPP) is a collaboration between groups of telecommunications standard bodies across the world, such as the Association of Radio Industries and Businesses (ARIB), the Telecommunications Technology Committee (TTC), the China Communications Standards Association (CCSA), the Alliance for Telecommunications Industry Solutions (ATIS), the Telecommunications Technology Association (TTA), the European Telecommunications Standards Institute (ETSI), and the Telecommunications Standards Development Society, India (TSDSI).

Working within the scope of the ITU, 3GPP develops and maintains technical specifications for a variety of mobile communication technologies, including, for example, second generation (2G) technology (for instance, Global System for Mobile Communications (GSM) and Enhanced Data Rates for GSM Evolution (EDGE)), third generation (3G) technology (for instance, Universal Mobile Telecommunications System (UMTS) and High Speed Packet Access (HSPA)), and fourth generation (4G) technology (for instance, Long Term Evolution (LTE) and LTE-Advanced).

The technical specifications controlled by 3GPP can be expanded and revised by specification releases, which can span multiple years and specify a breadth of new features and evolutions.

In one example, 3GPP introduced carrier aggregation (CA) for LTE in Release 10. Although initially introduced with two downlink carriers, 3GPP expanded carrier aggregation in Release 14 to include up to five downlink carriers and up to three uplink carriers. Other examples of new features and evolutions provided by 3GPP releases include, but are not limited to, License Assisted Access (LAA), enhanced LAA (eLAA), Narrowband Internet of things (NB-IOT), Vehicle-to-Everything (V2X), and High Power User Equipment (HPUE).

3GPP introduced Phase 1 of fifth generation (5G) technology in Release 15, and introduced Phase 2 of 5G technology in Release 16. Subsequent 3GPP releases will further evolve and expand 5G technology. 5G technology is also referred to herein as 5G New Radio (NR).

5G NR supports or plans to support a variety of features, such as communications over millimeter wave spectrum, beamforming capability, high spectral efficiency waveforms, low latency communications, multiple radio numerology, and/or non-orthogonal multiple access (NOMA). Although such RF functionalities offer flexibility to networks and enhance user data rates, supporting such features can pose a number of technical challenges.

The teachings herein are applicable to a wide variety of communication systems, including, but not limited to, communication systems using advanced cellular technologies, such as LTE-Advanced, LTE-Advanced Pro, and/or 5G NR.

FIG. 1 is a schematic diagram of one example of a communication network 10. The communication network 10 includes a macro cell base station 1, a small cell base station 3, and various examples of user equipment (UE), including a first mobile device 2*a*, a wireless-connected car 2*b*, a laptop 2*c*, a stationary wireless device 2*d*, a wireless-connected train 2*e*, a second mobile device 2*f*, and a third mobile device 2*g*.

Although specific examples of base stations and user equipment are illustrated in FIG. 1, a communication network can include base stations and user equipment of a wide variety of types and/or numbers.

For instance, in the example shown, the communication network 10 includes the macro cell base station 1 and the small cell base station 3. The small cell base station 3 can operate with relatively lower power, shorter range, and/or with fewer concurrent users relative to the macro cell base station 1. The small cell base station 3 can also be referred to as a femtocell, a picocell, or a microcell. Although the communication network 10 is illustrated as including two base stations, the communication network 10 can be implemented to include more or fewer base stations and/or base stations of other types.

Although various examples of user equipment are shown, the teachings herein are applicable to a wide variety of user equipment, including, but not limited to, mobile phones, tablets, laptops, IoT devices, wearable electronics, customer premises equipment (CPE), wireless-connected vehicles, wireless relays, and/or a wide variety of other communication devices. Furthermore, user equipment includes not only currently available communication devices that operate in a cellular network, but also subsequently developed communication devices that will be readily implementable with the inventive systems, processes, methods, and devices as described and claimed herein.

The illustrated communication network 10 of FIG. 1 supports communications using a variety of cellular technologies, including, for example, 4G LTE and 5G NR. In certain implementations, the communication network 10 is further adapted to provide a wireless local area network (WLAN), such as WiFi. Although various examples of communication technologies have been provided, the communication network 10 can be adapted to support a wide variety of communication technologies.

Various communication links of the communication network 10 have been depicted in FIG. 1. The communication links can be duplexed in a wide variety of ways, including, for example, using frequency-division duplexing (FDD) and/or time-division duplexing (TDD). FDD is a type of radio frequency communications that uses different frequencies for transmitting and receiving signals. FDD can provide a number of advantages, such as high data rates and low latency. In contrast, TDD is a type of radio frequency communications that uses about the same frequency for transmitting and receiving signals, and in which transmit and receive communications are switched in time. TDD can provide a number of advantages, such as efficient use of spectrum and variable allocation of throughput between transmit and receive directions.

In certain implementations, user equipment can communicate with a base station using one or more of 4G LTE, 5G NR, and WiFi technologies. In certain implementations, enhanced license assisted access (eLAA) is used to aggregate one or more licensed frequency carriers (for instance, licensed 4G LTE and/or 5G NR frequencies), with one or more unlicensed carriers (for instance, unlicensed WiFi frequencies).

As shown in FIG. 1, the communication links include not only communication links between UE and base stations, but also UE to UE communications and base station to base station communications. For example, the communication network 10 can be implemented to support self-fronthaul and/or self-backhaul (for instance, as between mobile device 2*g* and mobile device 2*f*).

The communication links can operate over a wide variety of frequencies. In certain implementations, communications are supported using 5G NR technology over one or more frequency bands that are less than 6 Gigahertz (GHz) and/or over one or more frequency bands that are greater than 6 GHz. For example, the communication links can serve Frequency Range 1 (FR1), Frequency Range 2 (FR2), or a combination thereof. In one embodiment, one or more of the mobile devices support a HPUE power class specification.

In certain implementations, a base station and/or user equipment communicates using beamforming. For example, beamforming can be used to focus signal strength to overcome path losses, such as high loss associated with communicating over high signal frequencies. In certain embodiments, user equipment, such as one or more mobile phones, communicate using beamforming on millimeter wave frequency bands in the range of 30 GHz to 300 GHz and/or upper centimeter wave frequencies in the range of 6 GHz to 30 GHz, or more particularly, 24 GHz to 30 GHz. Cellular user equipment can communicate using beamforming and/or other techniques over a wide range of frequencies, including, for example, FR2-1 (24 GHz to 52 GHz), FR2-2 (52 GHz to 71 GHz), and/or FR1 (400 MHz to 7125 MHz).

Different users of the communication network 10 can share available network resources, such as available frequency spectrum, in a wide variety of ways.

In one example, frequency division multiple access (FDMA) is used to divide a frequency band into multiple frequency carriers. Additionally, one or more carriers are allocated to a particular user. Examples of FDMA include, but are not limited to, single carrier FDMA (SC-FDMA) and orthogonal FDMA (OFDMA). OFDMA is a multicarrier technology that subdivides the available bandwidth into multiple mutually orthogonal narrowband subcarriers, which can be separately assigned to different users.

Other examples of shared access include, but are not limited to, time division multiple access (TDMA) in which a user is allocated particular time slots for using a frequency resource, code division multiple access (CDMA) in which a frequency resource is shared amongst different users by assigning each user a unique code, space-divisional multiple access (SDMA) in which beamforming is used to provide shared access by spatial division, and non-orthogonal multiple access (NOMA) in which the power domain is used for multiple access. For example, NOMA can be used to serve multiple users at the same frequency, time, and/or code, but with different power levels.

Enhanced mobile broadband (eMBB) refers to technology for growing system capacity of LTE networks. For example, eMBB can refer to communications with a peak data rate of at least 10 Gbps and a minimum of 100 Mbps for each user. Ultra-reliable low latency communications (uRLLC) refers to technology for communication with very low latency, for instance, less than 2 milliseconds. uRLLC can be used for mission-critical communications such as for autonomous driving and/or remote surgery applications. Massive machine-type communications (mMTC) refers to low cost and low data rate communications associated with wireless connections to everyday objects, such as those associated with Internet of Things (IoT) applications.

The communication network 10 of FIG. 1 can be used to support a wide variety of advanced communication features, including, but not limited to, eMBB, uRLLC, and/or mMTC.

Figure 2A:
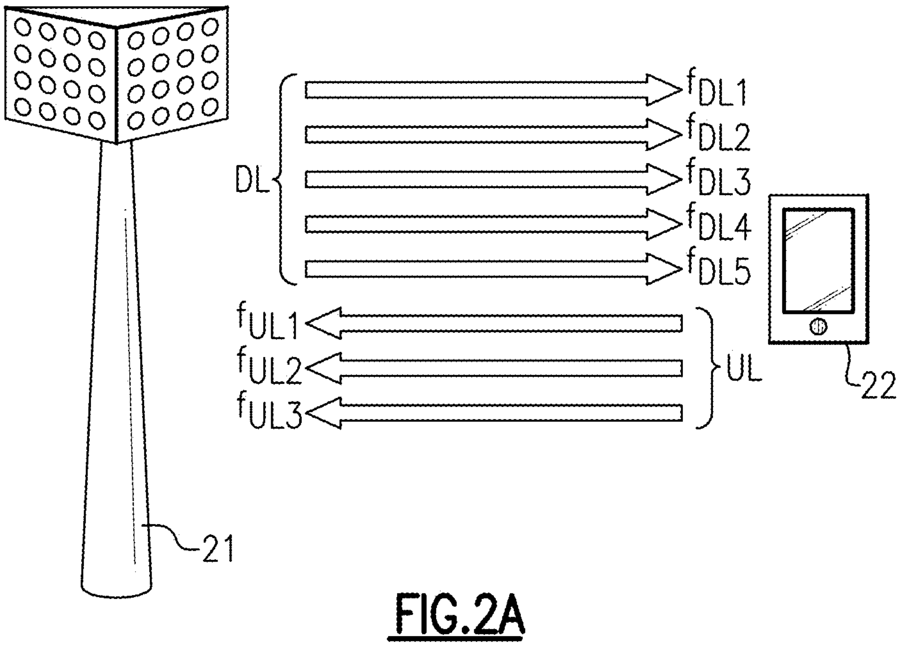
FIG. 2A is a schematic diagram of one example of a communication link using carrier aggregation.

FIG. 2A is a schematic diagram of one example of a communication link using carrier aggregation. Carrier aggregation can be used to widen bandwidth of the communication link by supporting communications over multiple frequency carriers, thereby increasing user data rates and enhancing network capacity by utilizing fragmented spectrum allocations.

In the illustrated example, the communication link is provided between a base station 21 and a mobile device 22. As shown in FIG. 2A, the communications link includes a downlink channel used for RF communications from the base station 21 to the mobile device 22, and an uplink channel used for RF communications from the mobile device 22 to the base station 21.

Although FIG. 2A illustrates carrier aggregation in the context of FDD communications, carrier aggregation can also be used for TDD communications.

In certain implementations, a communication link can provide asymmetrical data rates for a downlink channel and an uplink channel. For example, a communication link can be used to support a relatively high downlink data rate to enable high speed streaming of multimedia content to a mobile device, while providing a relatively slower data rate for uploading data from the mobile device to the cloud.

In the illustrated example, the base station 21 and the mobile device 22 communicate via carrier aggregation, which can be used to selectively increase bandwidth of the communication link. Carrier aggregation includes contiguous aggregation, in which contiguous carriers within the same operating frequency band are aggregated. Carrier aggregation can also be non-contiguous, and can include carriers separated in frequency within a common band or in different bands.

In the example shown in FIG. 2A, the uplink channel includes three aggregated component carriers $f_{UL1}$, $f_{UL2}$, and $f_{UL3}$. Additionally, the downlink channel includes five aggregated component carriers $f_{DL1}$, $f_{DL2}$, $f_{DL3}$, $f_{DL4}$, and $f_{DL5}$. Although one example of component carrier aggregation is shown, more or fewer carriers can be aggregated for uplink and/or downlink. Moreover, a number of aggregated carriers can be varied over time to achieve desired uplink and downlink data rates.

For example, a number of aggregated carriers for uplink and/or downlink communications with respect to a particular mobile device can change over time. For example, the number of aggregated carriers can change as the device moves through the communication network and/or as network usage changes over time.

Figure 2B:
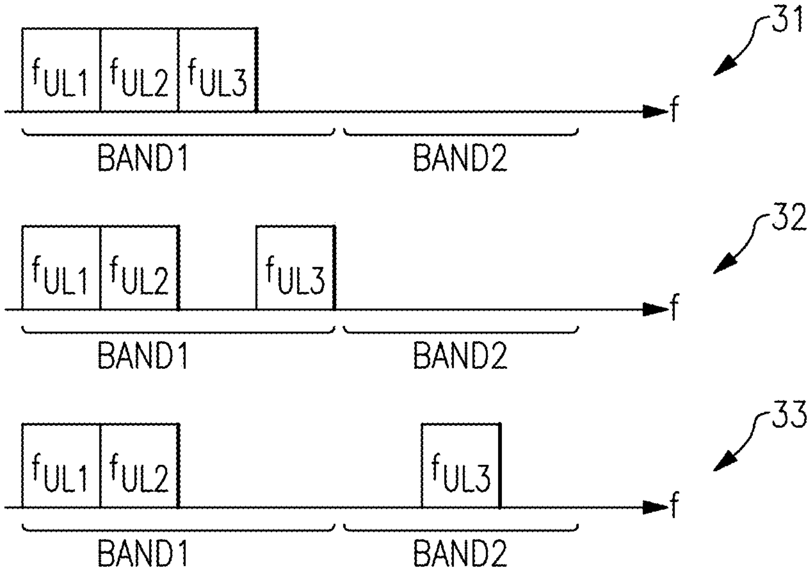
FIG. 2B illustrates various examples of uplink carrier aggregation for the communication link of FIG. 2A.

FIG. 2B illustrates various examples of uplink carrier aggregation for the communication link of FIG. 2A. FIG. 2B includes a first carrier aggregation scenario 31, a second carrier aggregation scenario 32, and a third carrier aggregation scenario 33, which schematically depict three types of carrier aggregation.

The carrier aggregation scenarios 31-33 illustrate different spectrum allocations for a first component carrier $f_{UL1}$, a second component carrier $f_{UL2}$, and a third component carrier $f_{UL3}$. Although FIG. 2B is illustrated in the context of aggregating three component carriers, carrier aggregation can be used to aggregate more or fewer carriers. Moreover, although illustrated in the context of uplink, the aggregation scenarios are also applicable to downlink.

The first carrier aggregation scenario 31 illustrates intra-band contiguous carrier aggregation, in which component carriers that are adjacent in frequency and in a common frequency band are aggregated. For example, the first carrier aggregation scenario 31 depicts aggregation of component carriers $f_{UL1}$, $f_{UL2}$, and $f_{UL3}$ that are contiguous and located within a first frequency band BAND1.

With continuing reference to FIG. 2B, the second carrier aggregation scenario 32 illustrates intra-band non-continuous carrier aggregation, in which two or more components carriers that are non-adjacent in frequency and within a common frequency band are aggregated. For example, the second carrier aggregation scenario 32 depicts aggregation of component carriers $f_{UL1}$, $f_{UL2}$, and $f_{UL3}$ that are non-contiguous, but located within a first frequency band BAND1.

The third carrier aggregation scenario 33 illustrates inter-band non-contiguous carrier aggregation, in which component carriers that are non-adjacent in frequency and in multiple frequency bands are aggregated. For example, the third carrier aggregation scenario 33 depicts aggregation of component carriers $f_{UL1}$ and $f_{UL2}$ of a first frequency band BAND1 with component carrier $f_{UL3}$ of a second frequency band BAND2.

Figure 2C:
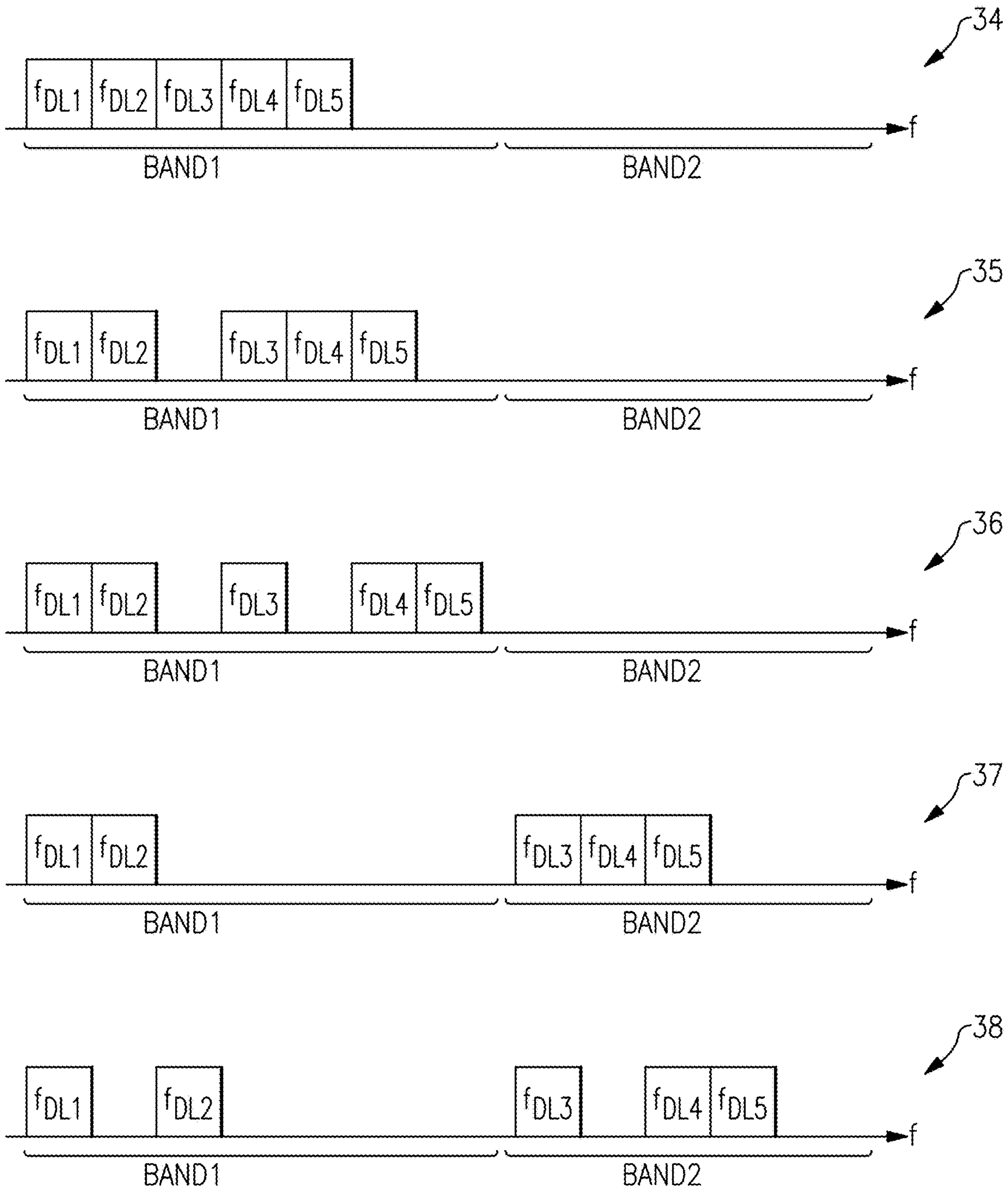
FIG. 2C illustrates various examples of downlink carrier aggregation for the communication link of FIG. 2A.

FIG. 2C illustrates various examples of downlink carrier aggregation for the communication link of FIG. 2A. The examples depict various carrier aggregation scenarios 34-38 for different spectrum allocations of a first component carrier $f_{DL1}$, a second component carrier $f_{DL2}$, a third component carrier $f_{DL3}$, a fourth component carrier $f_{DL4}$, and a fifth component carrier $f_{DL5}$. Although FIG. 2C is illustrated in the context of aggregating five component carriers, carrier aggregation can be used to aggregate more or fewer carriers. Moreover, although illustrated in the context of downlink, the aggregation scenarios are also applicable to uplink.

The first carrier aggregation scenario 34 depicts aggregation of component carriers that are contiguous and located within the same frequency band. Additionally, the second carrier aggregation scenario 35 and the third carrier aggregation scenario 36 illustrates two examples of aggregation that are non-contiguous, but located within the same frequency band. Furthermore, the fourth carrier aggregation scenario 37 and the fifth carrier aggregation scenario 38 illustrates two examples of aggregation in which component carriers that are non-adjacent in frequency and in multiple frequency bands are aggregated. As a number of aggregated component carriers increases, a complexity of possible carrier aggregation scenarios also increases.

With reference to FIGS. 2A-2C, the individual component carriers used in carrier aggregation can be of a variety of frequencies, including, for example, frequency carriers in the same band or in multiple bands. Additionally, carrier aggregation is applicable to implementations in which the individual component carriers are of about the same bandwidth as well as to implementations in which the individual component carriers have different bandwidths.

Certain communication networks allocate a particular user device with a primary component carrier (PCC) or anchor carrier for uplink and a PCC for downlink. Additionally, when the mobile device communicates using a single frequency carrier for uplink or downlink, the user device communicates using the PCC. To enhance bandwidth for uplink communications, the uplink PCC can be aggregated with one or more uplink secondary component carriers (SCCs). Additionally, to enhance bandwidth for downlink communications, the downlink PCC can be aggregated with one or more downlink SCCs.

In certain implementations, a communication network provides a network cell for each component carrier. Additionally, a primary cell can operate using a PCC, while a secondary cell can operate using a SCC. The primary and secondary cells may have different coverage areas, for instance, due to differences in frequencies of carriers and/or network environment.

License assisted access (LAA) refers to downlink carrier aggregation in which a licensed frequency carrier associated with a mobile operator is aggregated with a frequency carrier in unlicensed spectrum, such as WiFi. LAA employs a downlink PCC in the licensed spectrum that carries control and signaling information associated with the communication link, while unlicensed spectrum is aggregated for wider downlink bandwidth when available. LAA can operate with dynamic adjustment of secondary carriers to avoid WiFi users and/or to coexist with WiFi users. Enhanced license assisted access (eLAA) refers to an evolution of LAA that aggregates licensed and unlicensed spectrum for both downlink and uplink. Furthermore, NR-U can operate on top of LAA/eLAA over a 5 GHz band (5150 to 5925 MHz) and/or a 6 GHz band (5925 MHz to 7125 MHz).

Figure 3A:
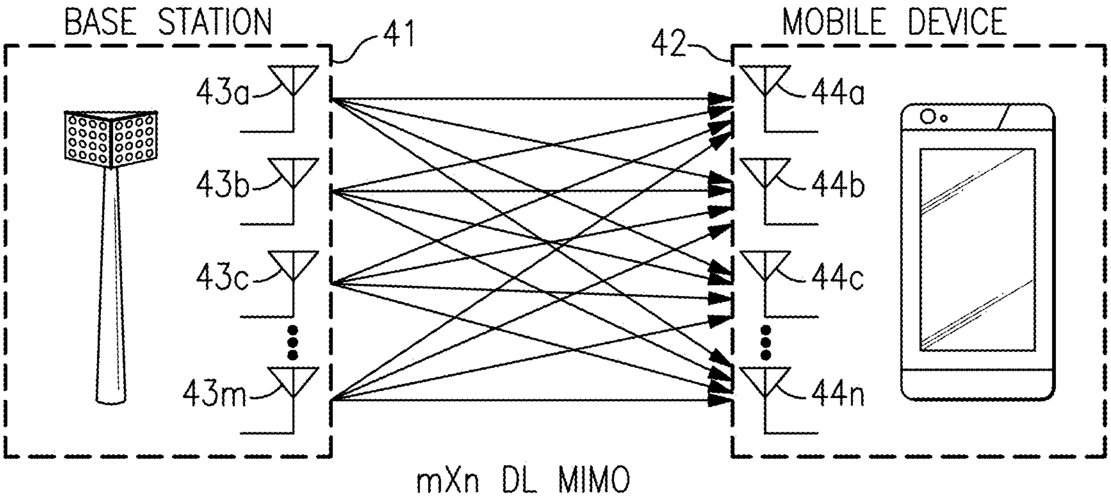
FIG. 3A is a schematic diagram of one example of a downlink channel using multi-input and multi-output (MIMO) communications.
Figure 3B:
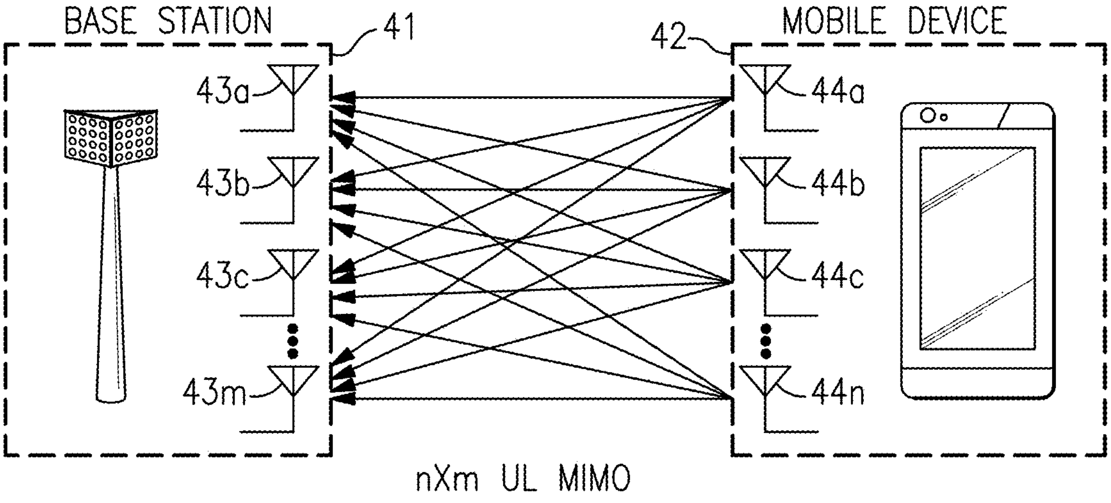
FIG. 3B is schematic diagram of one example of an uplink channel using MIMO communications.

FIG. 3A is a schematic diagram of one example of a downlink channel using multi-input and multi-output (MIMO) communications. FIG. 3B is schematic diagram of one example of an uplink channel using MIMO communications.

MIMO communications use multiple antennas for simultaneously communicating multiple data streams over common frequency spectrum. In certain implementations, the data streams operate with different reference signals to enhance data reception at the receiver. MIMO communications benefit from higher SNR, improved coding, and/or reduced signal interference due to spatial multiplexing differences of the radio environment.

MIMO order refers to a number of separate data streams sent or received. For instance, MIMO order for downlink communications can be described by a number of transmit antennas of a base station and a number of receive antennas for UE, such as a mobile device. For example, two-by-two (2×2) DL MIMO refers to MIMO downlink communications using two base station antennas and two UE antennas. Additionally, four-by-four (4×4) DL MIMO refers to MIMO downlink communications using four base station antennas and four UE antennas.

In the example shown in FIG. 3A, downlink MIMO communications are provided by transmitting using M antennas 43*a*, 43*b*, 43*c*, . . . 43*m* of the base station 41 and receiving using N antennas 44*a*, 44*b*, 44*c*, . . . 44*n* of the mobile device 42. Accordingly, FIG. 3A illustrates an example of m×n DL MIMO.

Likewise, MIMO order for uplink communications can be described by a number of transmit antennas of UE, such as a mobile device, and a number of receive antennas of a base station. For example, 2×2 UL MIMO refers to MIMO uplink communications using two UE antennas and two base station antennas. Additionally, 4×4 UL MIMO refers to MIMO uplink communications using four UE antennas and four base station antennas.

In the example shown in FIG. 3B, uplink MIMO communications are provided by transmitting using N antennas 44*a*, 44*b*, 44*c*, . . . 44*n* of the mobile device 42 and receiving using M antennas 43*a*, 43*b*, 43*c*, . . . 43*m* of the base station 41. Accordingly, FIG. 3B illustrates an example of n×m UL MIMO.

By increasing the level or order of MIMO, bandwidth of an uplink channel and/or a downlink channel can be increased.

MIMO communications are applicable to communication links of a variety of types, such as FDD communication links and TDD communication links.

Figure 3C:
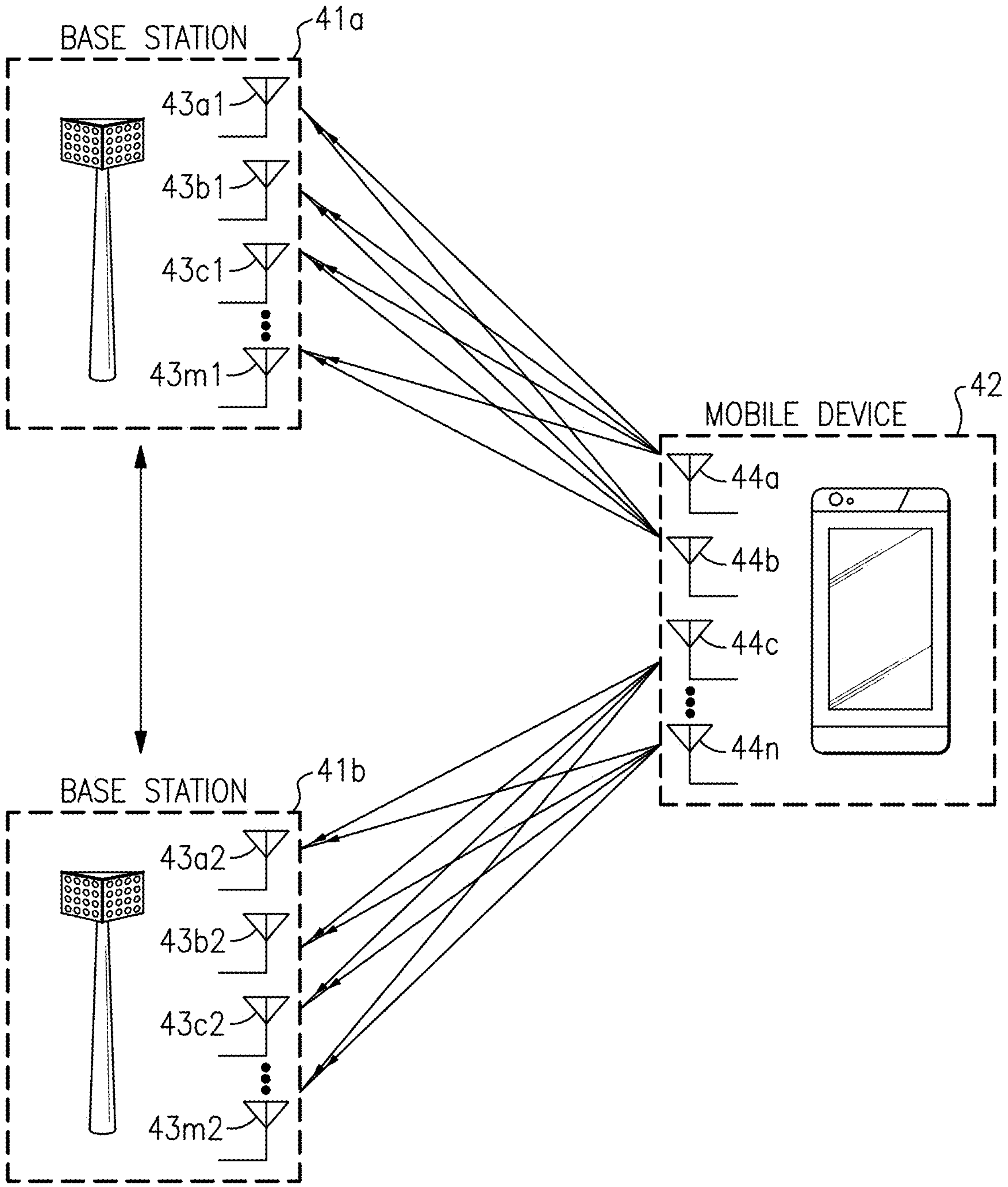
FIG. 3C is schematic diagram of another example of an uplink channel using MIMO communications.

FIG. 3C is schematic diagram of another example of an uplink channel using MIMO communications. In the example shown in FIG. 3C, uplink MIMO communications are provided by transmitting using N antennas 44*a*, 44*b*, 44*c*, . . . 44*n* of the mobile device 42. Additional a first portion of the uplink transmissions are received using M antennas 43*a*1, 43*b*1, 43*c*1, . . . 43*m*1 of a first base station 41*a*, while a second portion of the uplink transmissions are received using M antennas 43*a*2, 43*b*2, 43*c*2, . . . 43*m*2 of a second base station 41*b*. Additionally, the first base station 41*a* and the second base station 41*b* communication with one another over wired, optical, and/or wireless links.

The MIMO scenario of FIG. 3C illustrates an example in which multiple base stations cooperate to facilitate MIMO communications.

Figure 4A:
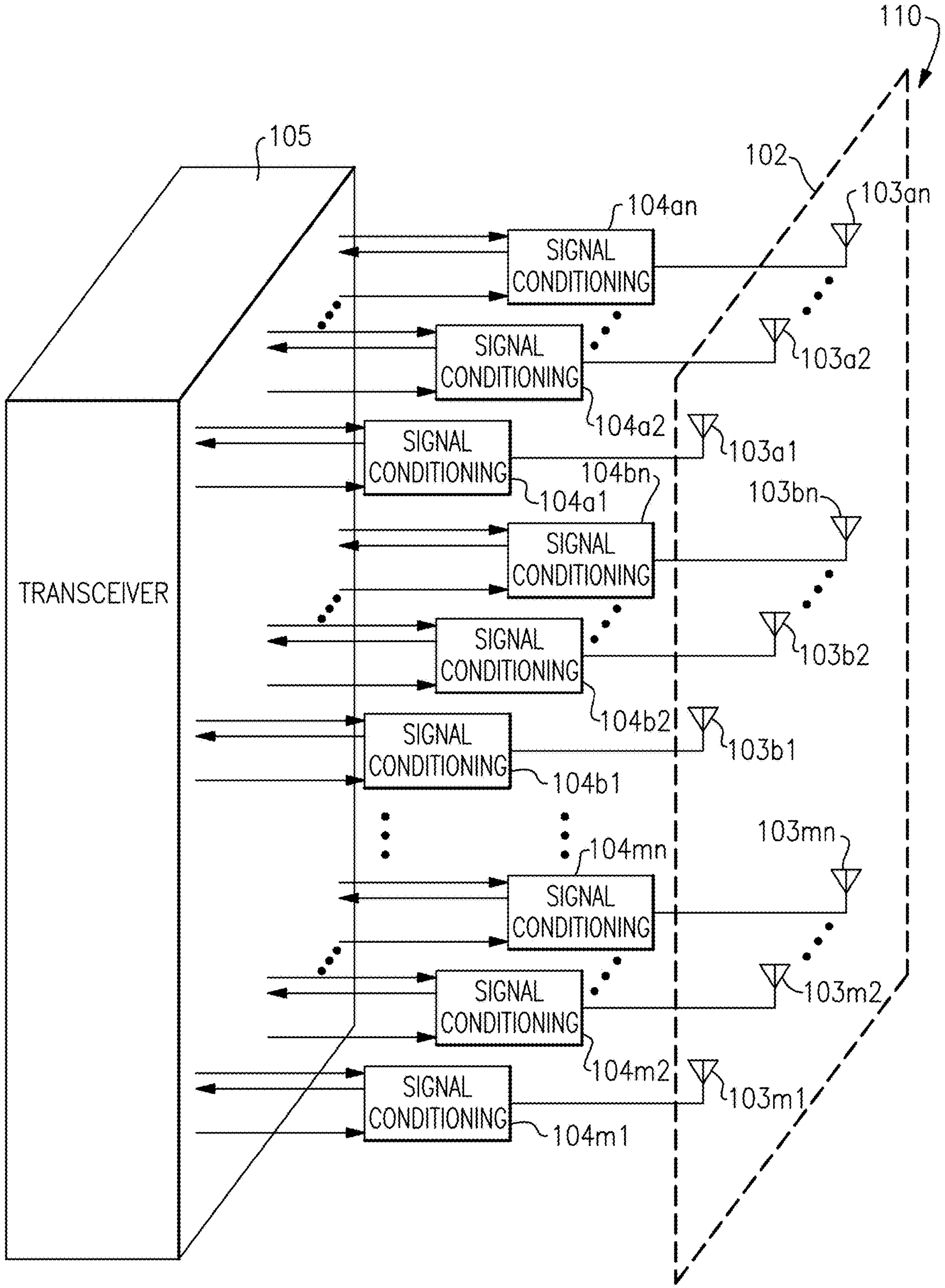
FIG. 4A is a schematic diagram of one example of a communication system that operates with beamforming.

FIG. 4A is a schematic diagram of one example of a communication system 110 that operates with beamforming. The communication system 110 includes a transceiver 105, signal conditioning circuits 104*a*1, 104*a*2 . . . 104*an*, 104*b*1, 104*b*2 . . . 104*bn*, 104*m*1, 104*m*2 . . . 104*mn*, and an antenna array 102 that includes antenna elements 103*a*1, 103*a*2 . . . 103*an*, 103*b*1, 103*b*2 . . . 103*bn*, 103*m*1, 103*m*2 . . . 103*mn*.

Communications systems that communicate using millimeter wave carriers (for instance, 30 GHz to 300 GHz), centimeter wave carriers (for instance, 3 GHz to 30 GHz), and/or other frequency carriers can employ an antenna array to provide beam formation and directivity for transmission and/or reception of signals.

For example, in the illustrated embodiment, the communication system 110 includes an array 102 of m×n antenna elements, which are each controlled by a separate signal conditioning circuit, in this embodiment. As indicated by the ellipses, the communication system 110 can be implemented with any suitable number of antenna elements and signal conditioning circuits.

With respect to signal transmission, the signal conditioning circuits can provide transmit signals to the antenna array 102 such that signals radiated from the antenna elements combine using constructive and destructive interference to generate an aggregate transmit signal exhibiting beam-like qualities with more signal strength propagating in a given direction away from the antenna array 102.

In the context of signal reception, the signal conditioning circuits process the received signals (for instance, by separately controlling received signal phases) such that more signal energy is received when the signal is arriving at the antenna array 102 from a particular direction. Accordingly, the communication system 110 also provides directivity for reception of signals.

The relative concentration of signal energy into a transmit beam or a receive beam can be enhanced by increasing the size of the array. For example, with more signal energy focused into a transmit beam, the signal is able to propagate for a longer range while providing sufficient signal level for RF communications. For instance, a signal with a large proportion of signal energy focused into the transmit beam can exhibit high effective isotropic radiated power (EIRP).

In the illustrated embodiment, the transceiver 105 provides transmit signals to the signal conditioning circuits and processes signals received from the signal conditioning circuits. As shown in FIG. 4A, the transceiver 105 generates control signals for the signal conditioning circuits. The control signals can be used for a variety of functions, such as controlling the gain and phase of transmitted and/or received signals to control beamforming.

Figure 4B:
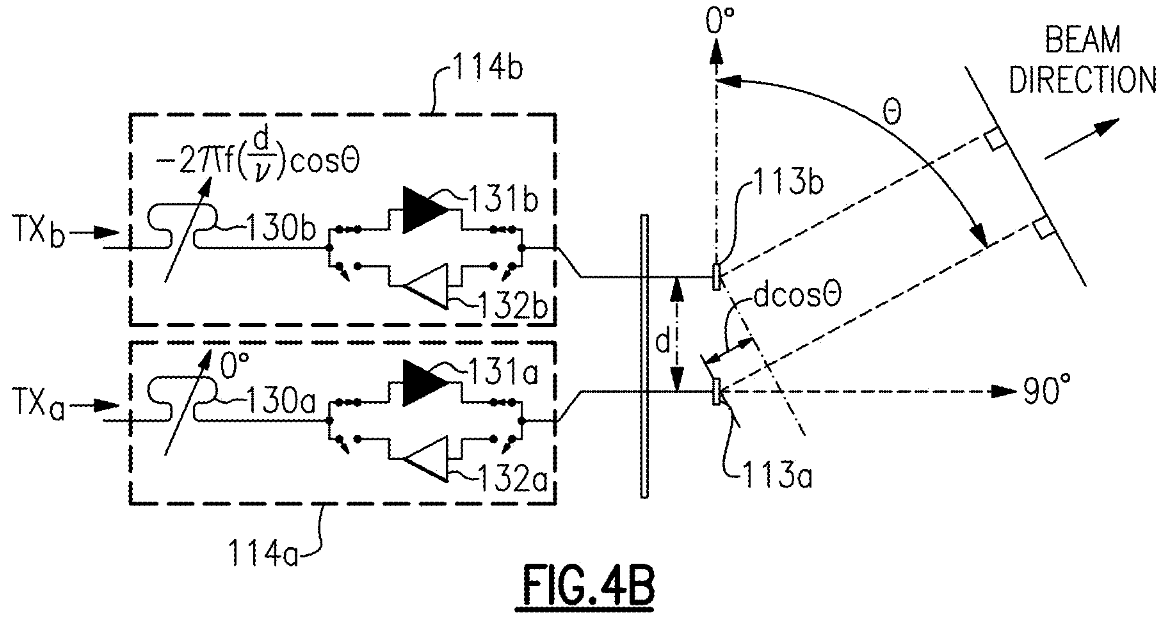
FIG. 4B is a schematic diagram of one example of beamforming to provide a transmit beam.

FIG. 4B is a schematic diagram of one example of beamforming to provide a transmit beam. FIG. 4B illustrates a portion of a communication system including a first signal conditioning circuit 114*a*, a second signal conditioning circuit 114*b*, a first antenna element 113*a*, and a second antenna element 113*b*.

Although illustrated as included two antenna elements and two signal conditioning circuits, a communication system can include additional antenna elements and/or signal conditioning circuits. For example, FIG. 4B illustrates one embodiment of a portion of the communication system 110 of FIG. 4A.

The first signal conditioning circuit 114*a* includes a first phase shifter 130*a*, a first power amplifier 131*a*, a first low noise amplifier (LNA) 132*a*, and switches for controlling selection of the power amplifier 131*a* or LNA 132*a*. Additionally, the second signal conditioning circuit 114*b* includes a second phase shifter 130*b*, a second power amplifier 13*ib*, a second LNA 132*b*, and switches for controlling selection of the power amplifier 131*b* or LNA 132*b*.

Although one embodiment of signal conditioning circuits is shown, other implementations of signal conditioning circuits are possible. For instance, in one example, a signal conditioning circuit includes one or more band filters, duplexers, and/or other components.

In the illustrated embodiment, the first antenna element 113*a* and the second antenna element 113*b* are separated by a distance d. Additionally, FIG. 4B has been annotated with an angle θ, which in this example has a value of about 900 when the transmit beam direction is substantially perpendicular to a plane of the antenna array and a value of about 0° when the transmit beam direction is substantially parallel to the plane of the antenna array.

By controlling the relative phase of the transmit signals provided to the antenna elements 113*a*, 113*b*, a desired transmit beam angle θ can be achieved. For example, when the first phase shifter 130*a* has a reference value of 0°, the second phase shifter 130*b* can be controlled to provide a phase shift of about $-2\pi f(d/v)\cos\theta$ radians, where f is the fundamental frequency of the transmit signal, d is the distance between the antenna elements, v is the velocity of the radiated wave, and π is the mathematic constant pi.

In certain implementations, the distance d is implemented to be about ½λ, where λ is the wavelength of the fundamental component of the transmit signal. In such implementations, the second phase shifter 130*b* can be controlled to provide a phase shift of about $-\pi\cos\theta$ radians to achieve a transmit beam angle θ.

Accordingly, the relative phase of the phase shifters 130*a*, 130*b* can be controlled to provide transmit beamforming. In certain implementations, a baseband processor and/or a transceiver (for example, the transceiver 105 of FIG. 4A) controls phase values of one or more phase shifters and gain values of one or more controllable amplifiers to control beamforming.

Figure 4C:
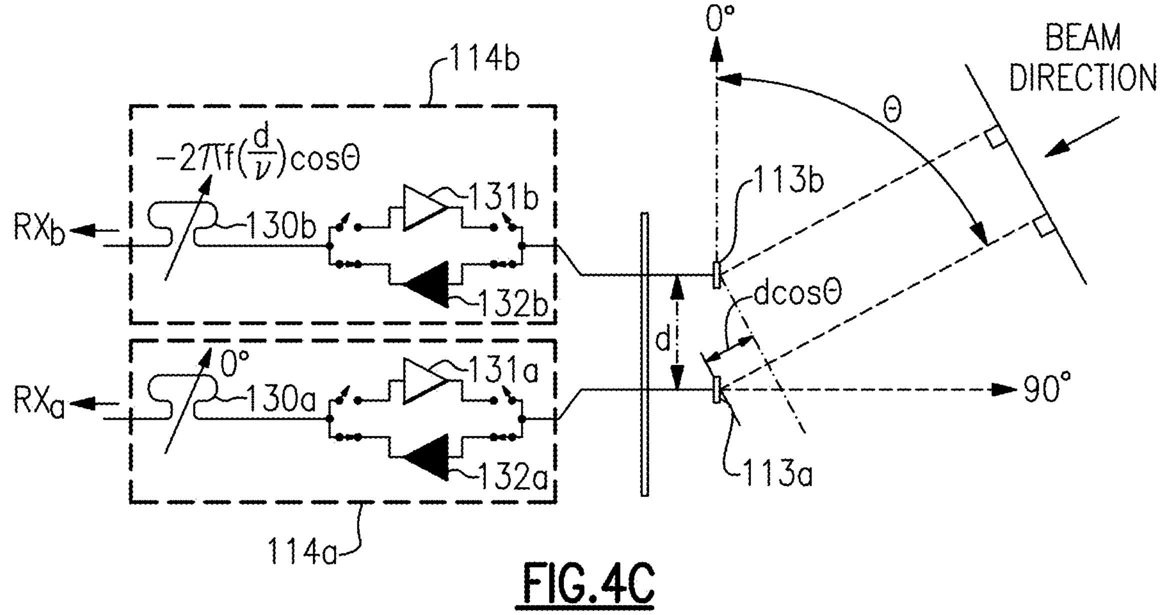
FIG. 4C is a schematic diagram of one example of beamforming to provide a receive beam.

FIG. 4C is a schematic diagram of one example of beamforming to provide a receive beam. FIG. 4C is similar to FIG. 4B, except that FIG. 4C illustrates beamforming in the context of a receive beam rather than a transmit beam.

As shown in FIG. 4C, a relative phase difference between the first phase shifter 130*a* and the second phase shifter 130*b* can be selected to about equal to $-2\pi f(d/v)\cos\theta$ radians to achieve a desired receive beam angle θ. In implementations in which the distance d corresponds to about ½λ, the phase difference can be selected to about equal to $-\pi\cos\theta$ radians to achieve a receive beam angle θ.

Although various equations for phase values to provide beamforming have been provided, other phase selection values are possible, such as phase values selected based on implementation of an antenna array, implementation of signal conditioning circuits, and/or a radio environment.

Bandgap Reference Generation for Multiple Power Supply Domains

Provided herein are bandgap reference generators suitable for operating in multiple power supply domains. In certain embodiments, a bandgap reference generator includes a low voltage bandgap reference circuit that generates a first bandgap reference voltage, a high voltage bandgap reference circuit that generates a second bandgap reference voltage, a bandgap selector circuit that outputs the first bandgap reference voltage or the second bandgap reference voltage as a selected bandgap reference voltage based on a voltage level of the power supply voltage, and a bandgap translator circuit that generates a buffered bandgap reference voltage based on the selected bandgap reference voltage.

By implementing the bandgap reference generator in this manner, enhanced flexibility is provided by allowing the bandgap reference generator to operate with different voltage levels of the power supply voltage. Thus, the buffered bandgap reference voltage serves as an accurate reference voltage in a wide range of deployment scenarios associated with different power supply domains. Accordingly, the bandgap reference generator avoids a need for custom designs targeted for a particular power supply domain and/or reduces or eliminates constraints on power supply voltage.

Thus, the bandgap reference generator overcomes limitations of the low voltage bandgap reference circuit and the high voltage bandgap reference circuit by selecting an appropriate bandgap reference voltage based on the voltage level of the power supply voltage. For example, the low voltage bandgap reference circuit can operate over a first range of the power supply voltage, while the high voltage bandgap reference circuit can operate over a second range of the power supply voltage greater than the first range.

In certain implementations, the bandgap reference generator further includes a coarse bandgap reference circuit that generates a third bandgap reference voltage, which the bandgap selector circuit compares to the voltage level of the power supply voltage to aid in selecting the appropriate bandgap reference voltage.

Although the coarse bandgap reference voltage is of a lower precision than the first bandgap reference voltage and the second bandgap reference voltage, the coarse bandgap reference circuit operates over a wider range of the power supply voltage than the individual ranges of the low voltage bandgap reference circuit and the high voltage bandgap reference circuit. Thus, the coarse bandgap reference voltage is well-suited for comparing to the voltage level of the power supply voltage to aid in bandgap reference voltage selection.

In certain implementations, the bandgap translator circuit outputs multiple reference voltages by scaling the buffered bandgap reference voltage by different scaling factors. This in turn enhances flexibility by providing downstream circuitry with a wide range of reference voltage levels available for use.

In certain implementations, the bandgap translator circuit operates to compensate for a nominal voltage difference between the first bandgap reference voltage and the second bandgap reference voltage. Implementing the bandgap translator circuit in this manner aids in providing a substantially constant voltage level of the buffered bandgap reference voltage across operating conditions.

In certain implementations, the bandgap selector circuit provides the bandgap translator circuit with a mode signal indicating the selected bandgap reference voltage. The mode signal can serve a wide variety of functions, including, but not limited to, aiding the bandgap translator circuit in compensating for a nominal voltage difference between the first bandgap reference voltage and the second bandgap reference voltage.

For instance, the bandgap translator circuit can operate as a low dropout regulator when the mode signal indicates the first bandgap reference voltage is selected, and as a unity gain buffer when the mode signal indicates the second bandgap reference voltage is selected. Additionally, a gain from output to input of the low dropout regulator can correspond to the ratio of the second bandgap reference voltage to the first bandgap reference voltage, thereby compensating for the nominal voltage difference.

In certain implementations, the mode signal controls an impedance of a compensation circuit of the bandgap translator circuit, thereby maintaining stability of a feedback loop of the bandgap translator circuit.

In certain implementations, the bandgap reference generator is included on a semiconductor die of a front end system. Thus, the bandgap reference generator can serve to generate high precision reference voltages for a range of applications, including, but not limited to, on-die power sensing, on-die temperature sensing, fine-tuning biasing voltage/current generation, generating a high voltage supply voltage (for instance, 2.5V±10% or 3.3V±10%) of a power amplifier, generating a low voltage supply voltage (for instance, 1.2V±10%) for a low power/high speed compact digital core (which can include, for instance, a serial interface such as Mobile Industry Processor Interface (MIPI) and decoders realized in a low voltage/small feature size complementary metal-oxide-semiconductor (CMOS) technology), and/or generating a supply voltage (for instance, 1.8V±10%) for high performance analog blocks.

Thus, the bandgap reference generator provides references voltages in applications with multiple power supply voltage domains, for instance, high performance front end modules for millimeter wave (mmW) communications.

In certain implementations, the bandgap reference generator generates a low power supply voltage (1.2V±10%)/high-precision bandgap reference voltage (Vbg~700 mV), a higher power supply voltage (1.8V±10% and 2.5V to 3.3V applications)/high-precision bandgap reference voltage (Vbg~1110 mV), and a coarse bandgap reference voltage (Vbg~920 mV) across both 1.2V±10% standard and 1.8V±10% domain or higher supply voltage domains.

Additionally, the bandgap reference generator further includes a bandgap reference voltage selector operating over wide power supply range (from 1.08V to 1.98V) to determine whether to select the sub-1V bandgap reference voltage for low power supply voltage domains (1.2V±10%) or the >1V bandgap reference voltage for higher power supply voltage domains. Furthermore, the bandgap reference voltage selector makes the selection based by using the coarse bandgap reference voltage in a comparison operation. The bandgap reference generator further includes a multiple-output dual-input-mode bandgap reference voltage translator operating in wide power supply range (from 1.08V to 1.98V) to generate various high precision reference voltages for various applications.

Figure 5:
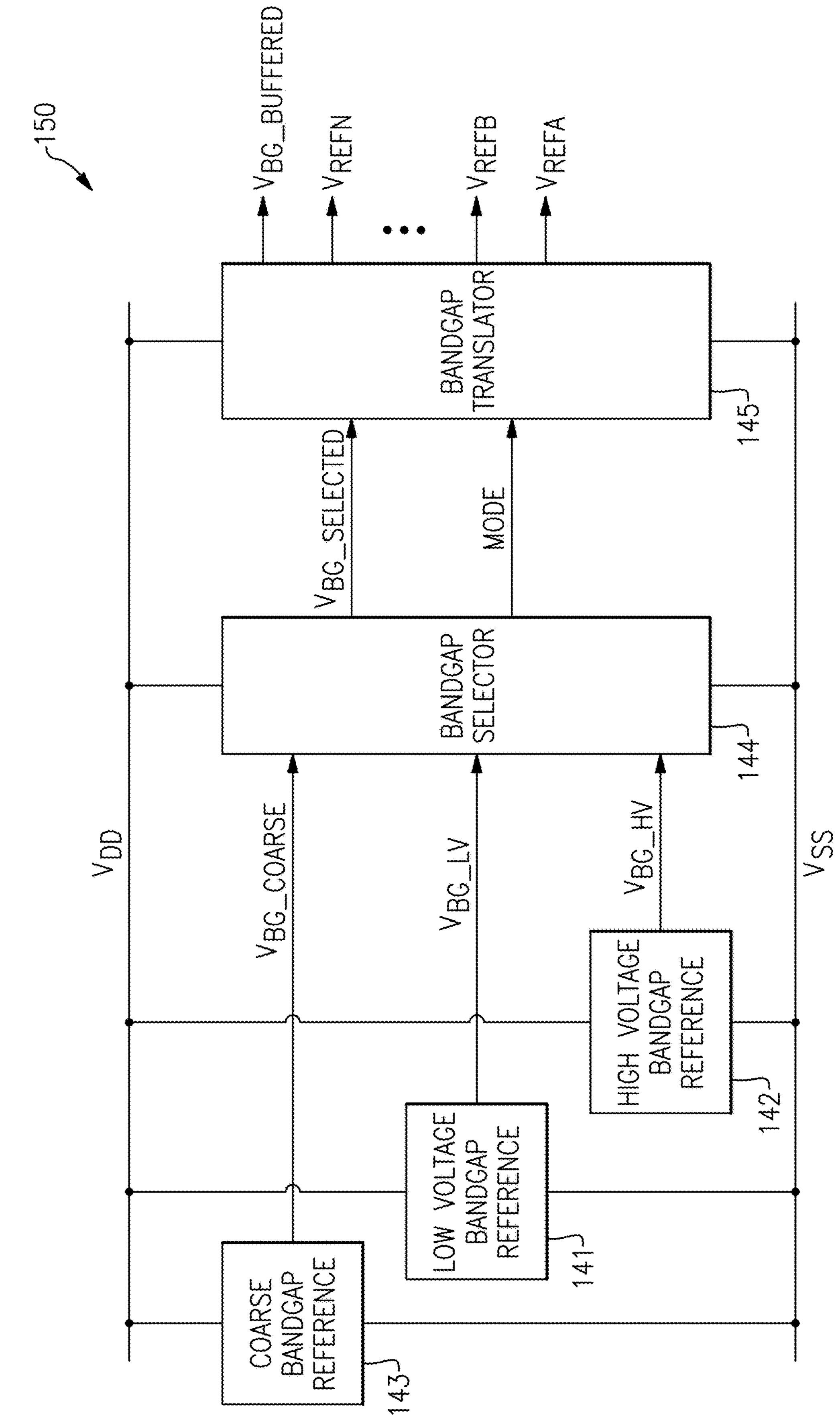
FIG. 5 is a schematic diagram of a multi-domain bandgap reference generator according to one embodiment.

FIG. 5 is a schematic diagram of a multi-domain bandgap reference generator 150 according to one embodiment. The multi-domain bandgap reference generator 150 includes a low voltage bandgap reference circuit 141, a high voltage bandgap reference circuit 142, a coarse bandgap reference circuit 143, a bandgap selector circuit 144, and a bandgap translator circuit 145. The multi-domain bandgap reference generator 150 is also referred to herein as the bandgap reference generator 150.

The bandgap reference generator 150 receives a power supply voltage $V_{DD}$ and a ground voltage $V_{SS}$. The bandgap reference generator 150 operates over a wide range of voltage levels of the power supply voltage $V_{DD}$, thereby providing suitable reference voltages for a wide range of applications and operating scenarios.

As shown in FIG. 5, the low voltage bandgap reference circuit 141 generates a first or low voltage bandgap reference voltage $V_{BG\_LV}$, the high voltage bandgap reference circuit 142 generates a second or high voltage bandgap reference voltage $V_{BG\_HV}$, and the coarse bandgap reference circuit 143 generates a third or coarse bandgap reference voltage $V_{BG\_COARSE}$.

The low voltage bandgap reference circuit 141 and the high voltage bandgap reference circuit 142 are suitable for operating over different ranges of the power supply voltage $V_{DD}$, such as a low voltage range and a high voltage range, respectively. Additionally, the coarse bandgap reference circuit 143 can operate over a wide voltage range (for instance, covering both the low voltage range and the high voltage range).

In the illustrated embodiment, the bandgap selector circuit 144 receives the low voltage bandgap reference voltage $V_{BG\_LV}$, the high voltage bandgap reference voltage $V_{BG\_HV}$, and the coarse bandgap reference voltage $V_{BG\_COARSE}$. Additionally, the bandgap selector circuit 144 generates a selected bandgap voltage $V_{BG\_SELECTED}$ based on selecting the low voltage bandgap reference voltage $V_{BG\_LV}$ or the high voltage bandgap reference voltage $V_{BG\_HV}$. The bandgap selector circuit 144 also generates a mode signal MODE indicating which bandgap reference voltage is selected, in this embodiment.

In certain implementations, the bandgap selector circuit 144 chooses the selected bandgap voltage $V_{BG\_SELECTED}$ based on comparing the power supply voltage $V_{DD}$ to the coarse bandgap reference voltage $V_{BG\_COARSE}$. For example, the bandgap selector circuit 144 can select the low voltage bandgap reference voltage $V_{BG\_LV}$ when $\alpha*V_{DD}$ is less than the coarse bandgap reference voltage $V_{BG\_COARSE}$, and select the high voltage bandgap reference voltage $V_{BG\_HV}$ when $\alpha*V_{DD}$ is greater than or equal to the coarse bandgap reference voltage $V_{BG\_COARSE}$, where a is scaling factor. In one example, a is controlled by a ratio of resistors of a voltage divider.

The bandgap translator circuit 145 receives the selected bandgap voltage $V_{BG\_SELECTED}$ and the mode signal MODE, and generates a buffered bandgap voltage $V_{BG\_BUFFERED}$ and multiple reference voltages $V_{REFA}$, $V_{REFB}$, . . . $V_{REFN}$ that are scaled in relation to the buffered bandgap voltage $V_{BG\_BUFFERED}$ by various scaling factors. The bandgap translator circuit 145 can serve to provide sufficient drive strength of the buffered bandgap voltage $V_{BG\_BUFFERED}$ for a wide range of applications and types of downstream circuitry.

In certain implementations, the bandgap translator circuit 145 serves to generate the buffered bandgap voltage $V_{BG\_BUFFERED}$ to compensate for a nominal voltage difference between the low voltage bandgap reference voltage $V_{BG\_LV}$ and the high voltage bandgap reference voltage $V_{BG\_HV}$.

The mode signal MODE can aid the bandgap translator circuit 145 in processing the selected bandgap voltage $V_{BG\_SELECTED}$ by indicating a voltage level of the selected bandgap voltage $V_{BG\_SELECTED}$. In certain implementations, the bandgap translator circuit 145 changes a gain or scaling between the buffered bandgap voltage $V_{BG\_BUFFERED}$ and the selected bandgap voltage $V_{BG\_SELECTED}$ based on the mode signal MODE.

In one example, the bandgap translator circuit 145 operates as a low dropout regulator when the mode signal MODE indicates the low voltage bandgap reference voltage $V_{BG\_LV}$ is selected, and as a unity gain buffer when the mode signal MODE indicates the high voltage bandgap reference voltage $V_{BG\_HV}$ is selected. Additionally, a gain from output to input of the low dropout regulator can correspond to the ratio of the high voltage bandgap reference voltage $V_{BG\_HV}$ to the low voltage bandgap reference voltage $V_{BG\_LV}$, thereby compensating for the nominal voltage difference.

Figure 6A:
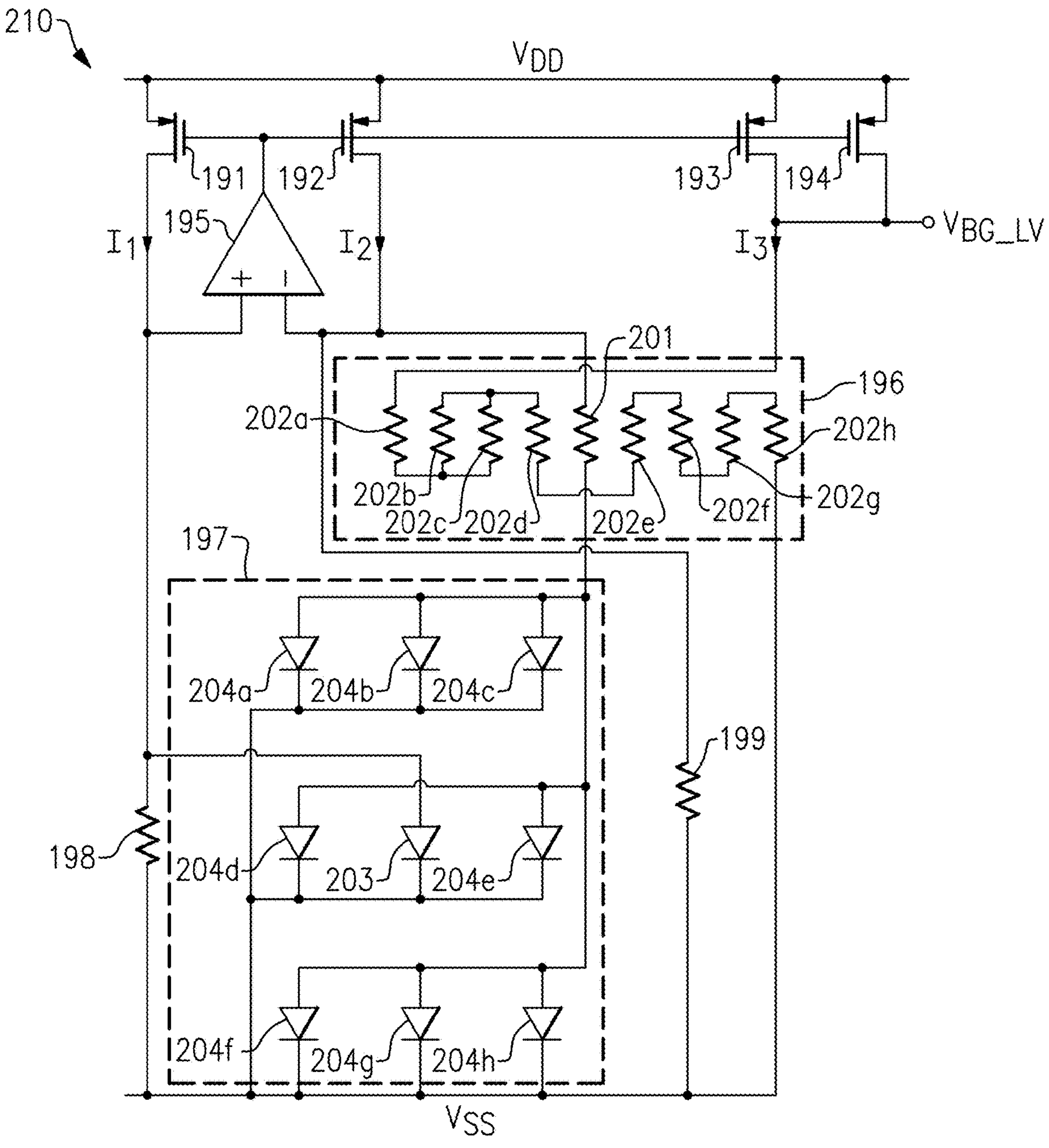
FIG. 6A is a schematic diagram of a low voltage bandgap reference circuit according to one embodiment.

FIG. 6A is a schematic diagram of a low voltage bandgap reference circuit 210 according to one embodiment. The low voltage bandgap reference circuit 210 includes a first p-type field effect transistor (PFET) 191, a second PFET 192, a third PFET 193, a fourth PFET 194, a differential amplifier 195 (for instance, an operational amplifier), a resistor array 196, a diode array 197, a first resistor 198, and a second resistor 199. The low voltage bandgap reference circuit 210 receives a power supply voltage $V_{DD}$ and a ground voltage $V_{SS}$, and generates a low voltage bandgap reference voltage $V_{BG\_LV}$.

The low voltage bandgap reference circuit 210 of FIG. 6A illustrates one embodiment of the low voltage bandgap reference circuit 141 of FIG. 5. However, the teachings herein are applicable to low voltage bandgap reference circuits implemented in other ways.

In the illustrated embodiment, the resistor array 196 includes an array of nine resistor elements including one resistor element 201 serving as a resistor R1 and eight resistor elements 202_a_-202_h_, respectively, serving as a resistor R2, with R1:R2=1:N. Implementing R1 and R2 using the resistor array 196 aids in providing enhanced matching in the presence of process variation.

As shown in FIG. 6A, the diode array 197 includes an array of nine diode elements including one diode element 203 serving as a diode D1 and eight diode elements 204_a_-204_h_, respectively, serving as a diode D2, with D1:D2=1:8. Implementing D1 and D2 using the diode array 197 aids in providing enhanced matching.

The differential amplifier 195 operates with feedback to control the gate voltages of PFETs 191-194, thereby controlling the currents flowing therethrough. In the illustrated embodiment, $I_1:I_2:I_3=1:1:2$. In certain implementations, the PFETs correspond to p-type metal oxide semiconductor (PMOS) transistors.

Figure 6B:
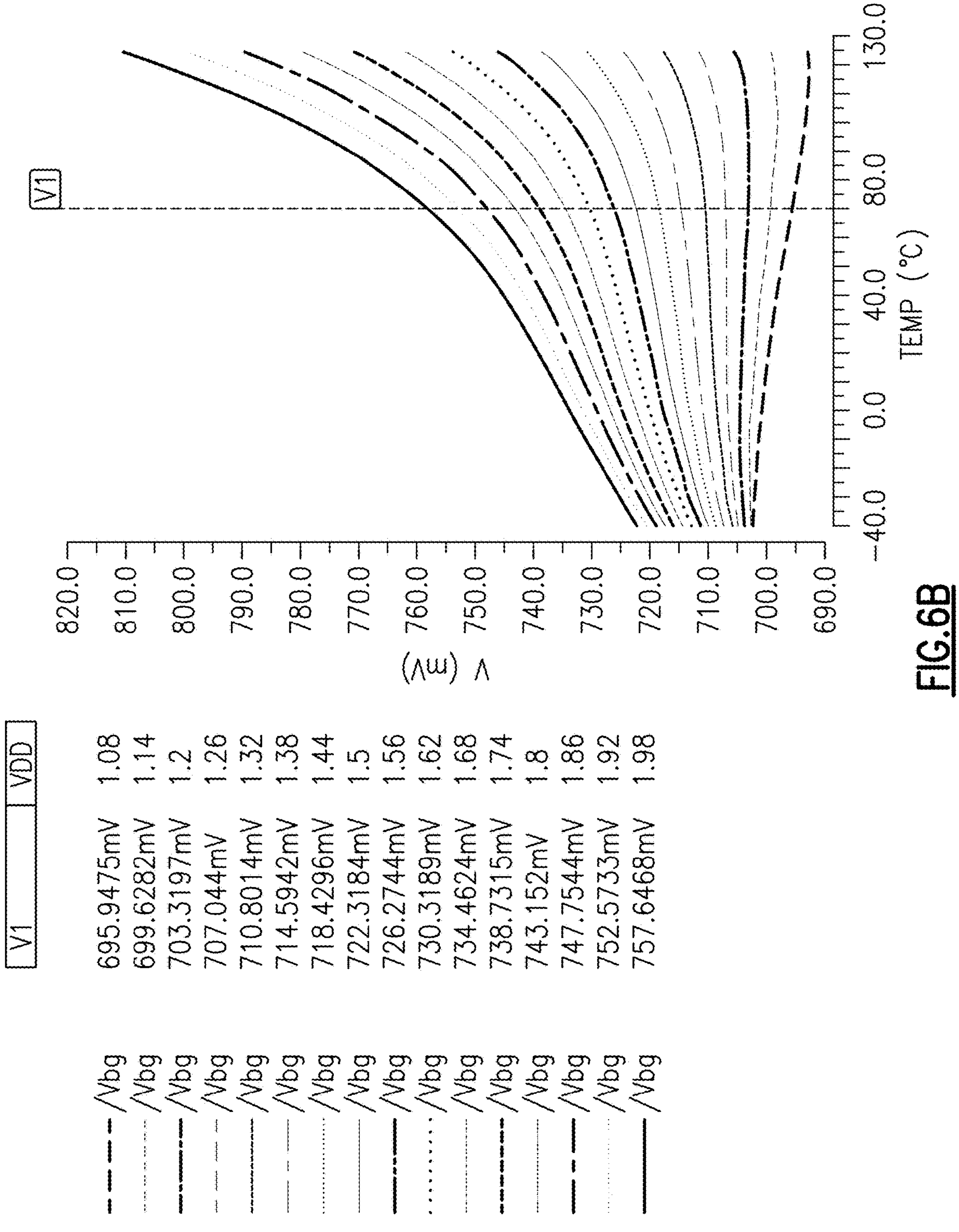
FIG. 6B is one example of a graph of bandgap reference voltage versus temperature for different power supply voltage levels for the low voltage bandgap reference circuit of FIG. 6A.

FIG. 6B is one example of a graph of bandgap reference voltage versus temperature for different power supply voltage levels for the low voltage bandgap reference circuit 210 of FIG. 6A. In the example of FIG. 6B, the low voltage bandgap reference circuit 210 outputs a reference voltage of about 700 mV for $V_{DD}$ between about 1.08 V and about 1.32V.

Figure 7A:
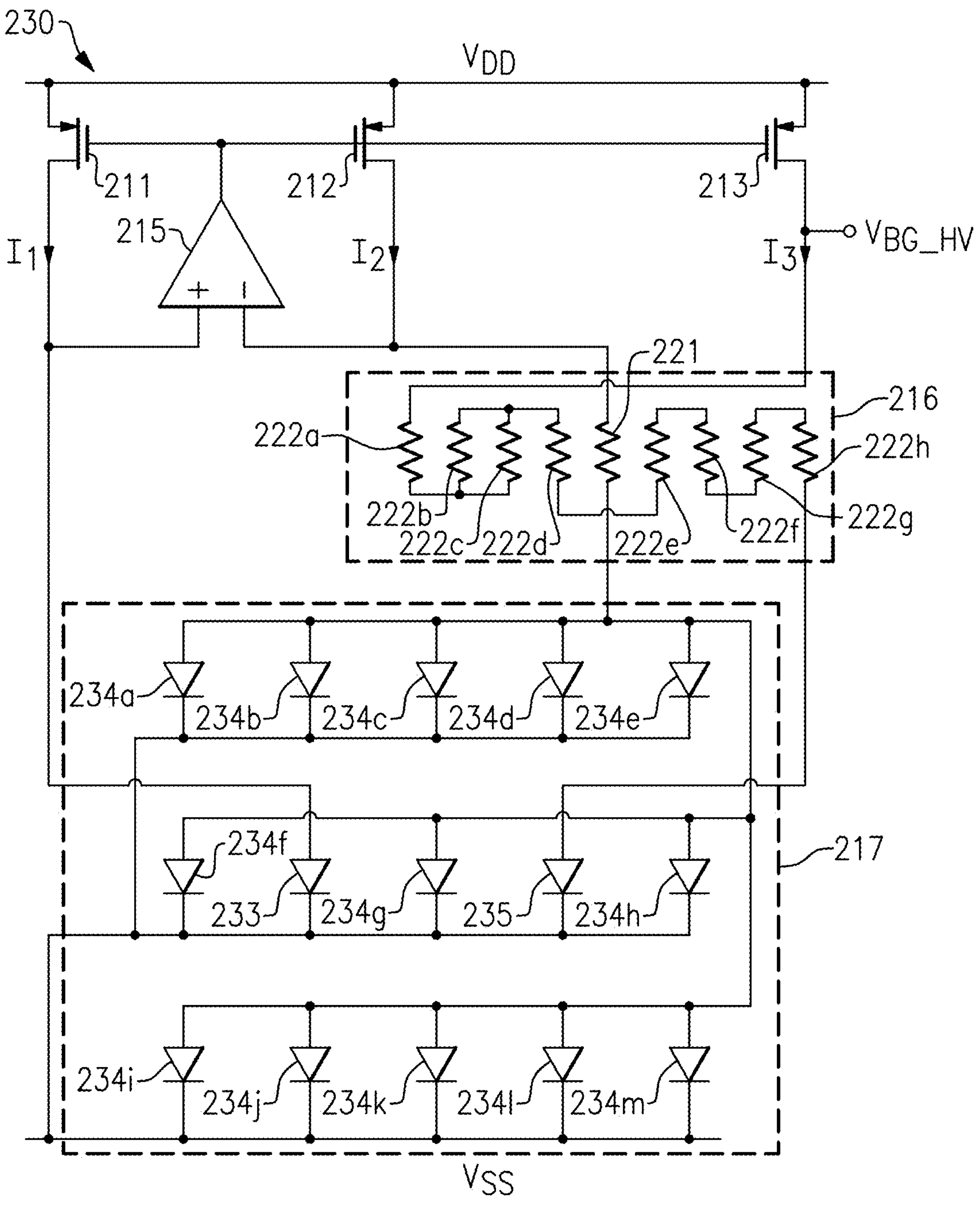
FIG. 7A is a schematic diagram of a high voltage bandgap reference circuit according to one embodiment.

FIG. 7A is a schematic diagram of a high voltage bandgap reference circuit 230 according to one embodiment. The high voltage bandgap reference circuit 230 includes a first PFET 211, a second PFET 212, a third PFET 213, a differential amplifier 215, a resistor array 216, and a diode array 217. The high voltage bandgap reference circuit 230 receives a power supply voltage $V_{DD}$ and a ground voltage $V_{SS}$, and generates a high voltage bandgap reference voltage $V_{BG\_HV}$.

The high voltage bandgap reference circuit 230 of FIG. 7A illustrates one embodiment of the high voltage bandgap reference circuit 142 of FIG. 5. However, the teachings herein are applicable to high voltage bandgap reference circuits implemented in other ways.

In the illustrated embodiment, the resistor array 216 includes an array of nine resistor elements including one resistor element 221 serving as a resistor R1 and eight resistor elements 222*a*-222*h*, respectively, serving as a resistor R2, with R1:R2=1:N.

As shown in FIG. 7A, the diode array 217 includes an array of fifteen diode elements including one diode element 233 serving as a diode D1, thirteen diode elements 234*a*-234*m*, respectively, serving as a diode D2, and one diode element 235 serving as a diode D3, with D1:D2:D3=1:13:1.

The differential amplifier 215 operates with feedback to control the gate voltages of PFETs 211-213, thereby controlling the currents flowing therethrough. In the illustrated embodiment, $I_1$:$I_2$:$I_3$=1:1:1.

Figure 7B:
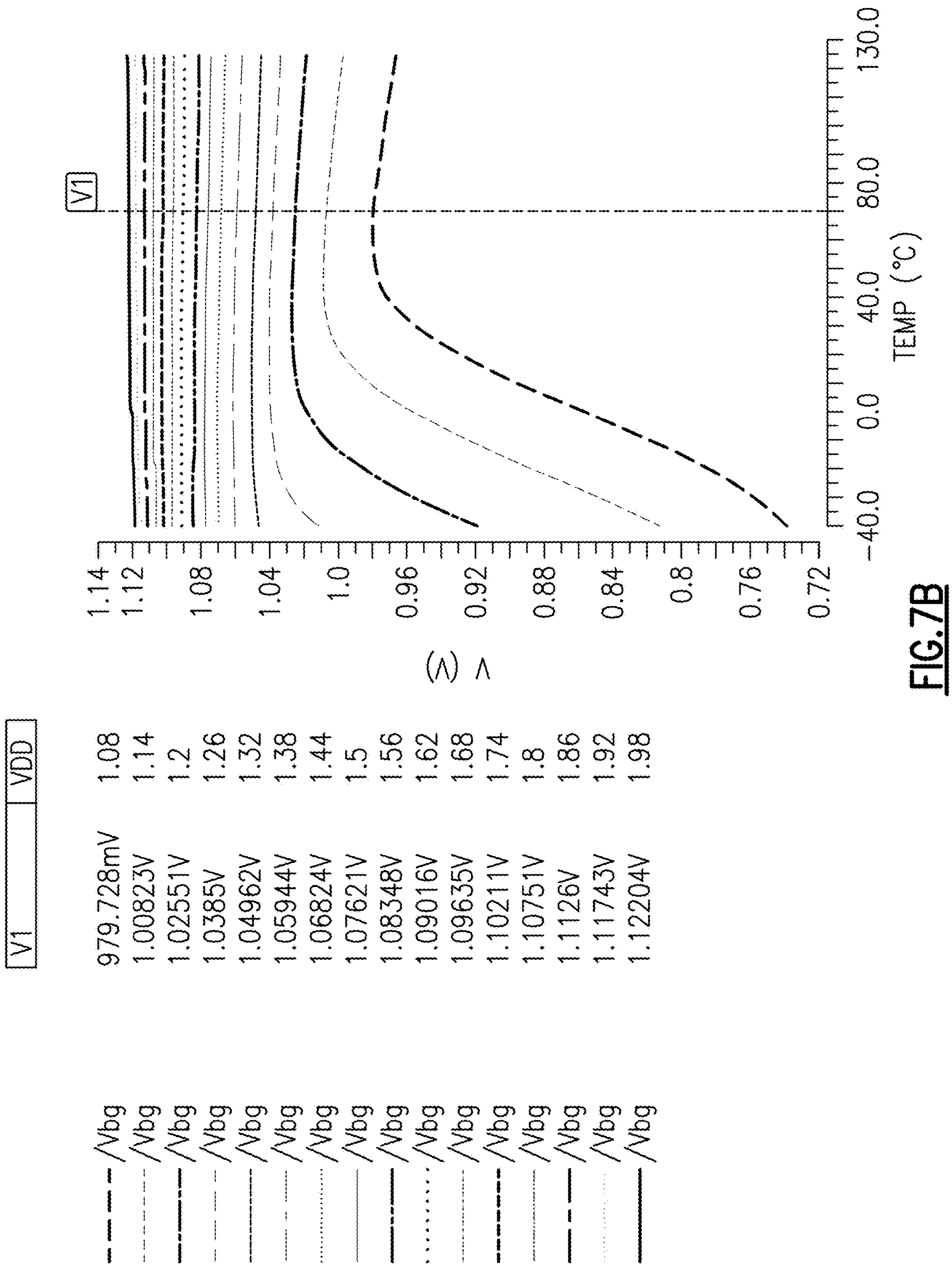
FIG. 7B is one example of a graph of bandgap reference voltage versus temperature for different power supply voltage levels for the high voltage bandgap reference circuit of FIG. 7A.

FIG. 7B is one example of a graph of bandgap reference voltage versus temperature for different power supply voltage levels for the high voltage bandgap reference circuit 230 of FIG. 7A. In the example of FIG. 7B, the high voltage bandgap reference circuit 230 outputs a reference voltage of about 1110 mV with very low temperature coefficient for $V_{DD}$ between about 1.6V and about 1.98V. Additionally, the temperature coefficient is relatively low for $V_{DD}$ between about 1.32V and about 1.6V.

Figure 8A:
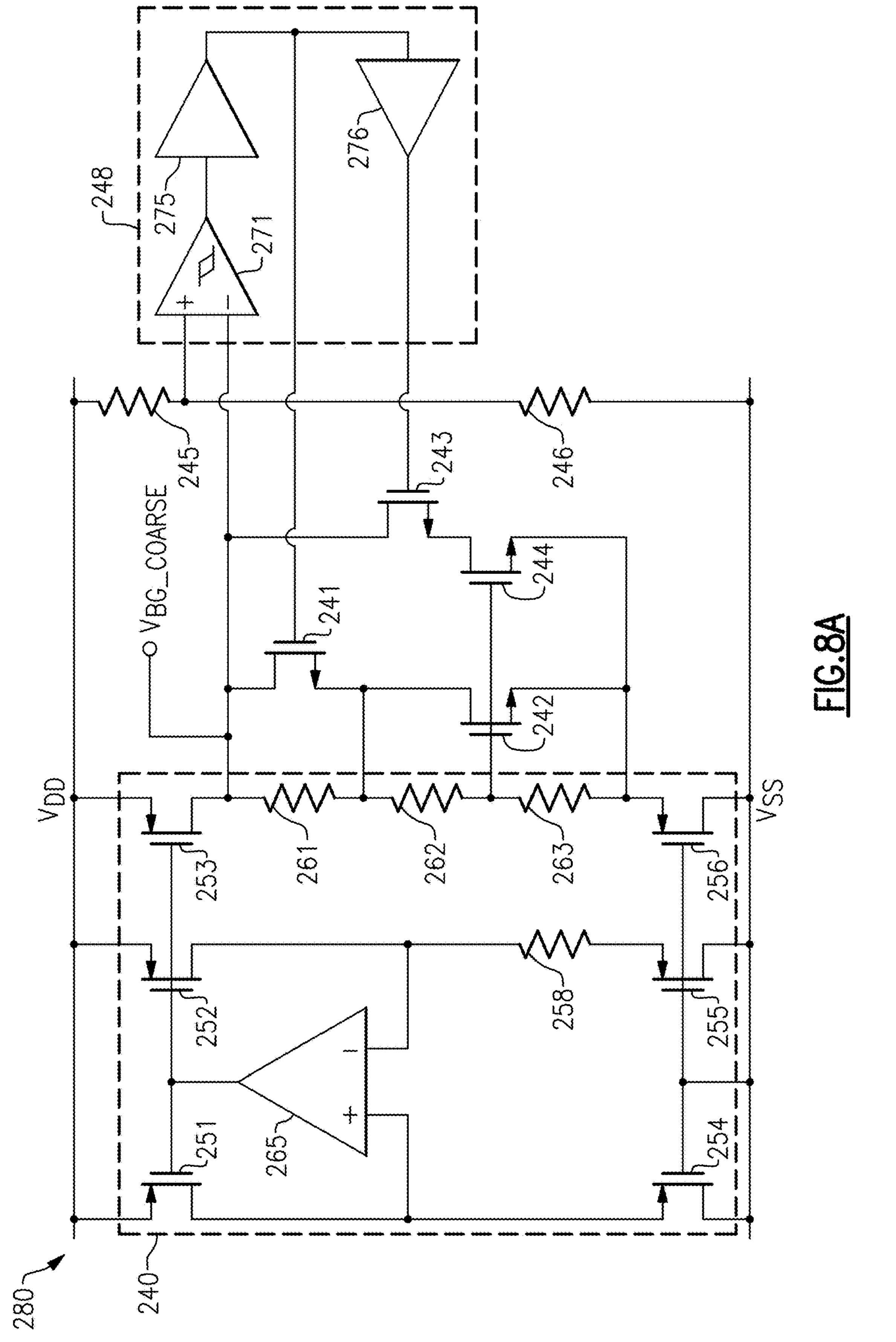
FIG. 8A is a schematic diagram of a coarse bandgap reference circuit according to one embodiment.

FIG. 8A is a schematic diagram of a coarse bandgap reference circuit 280 according to one embodiment. The coarse bandgap reference circuit 280 includes a PMOS-diode based bandgap core 240, a first output control n-type field effect transistor (NFET) 241, a second output control NFET 242, a first temperature compensation NFET 243, a second temperature compensation NFET 244, a first voltage dividing resistor 245, a second voltage dividing resistor 246, and a comparator 248. The coarse bandgap reference circuit 280 receives a power supply voltage $V_{DD}$ and a ground voltage $V_{SS}$, and generates a coarse bandgap reference voltage $V_{BG\_COARSE}$.

The coarse bandgap reference circuit 280 of FIG. 8A illustrates one embodiment of the coarse bandgap reference circuit 143 of FIG. 5. However, the teachings herein are applicable to coarse bandgap reference circuits implemented in other ways.

As shown in FIG. 8A, the PMOS-diode based bandgap core 240 includes a first PFET 251, a second PFET 252, a third PFET 253, a fourth PFET 254, a fifth PFET 255, a sixth PFET 256, a first output resistor 261, a second output resistor 262, a third output resistor 263, and a differential amplifier 265.

In the illustrated embodiment, the comparator 248 includes a hysteretic differential amplifier 271, a first inverting buffer 275, and a second inverting buffer 276. When the voltage level of the supply voltage $V_{DD}$ is relatively high compared to the coarse bandgap reference voltage $V_{BG\_COARSE}$, the comparator 248 activates the first temperature compensation NFET 243 for temperature control and deactivates the first output control NFET 241. However, when the voltage level of the supply voltage $V_{DD}$ is relatively low compared to the coarse bandgap reference voltage $V_{BG\_COARSE}$, the comparator 248 activates the first output control NFET 241 for output voltage control and deactivates the first temperature compensation NFET 243. The threshold for comparison in based on a ratio of the first voltage dividing resistor 245 and the second voltage dividing resistor 246, which in one example is 6:9.

Figure 8B:
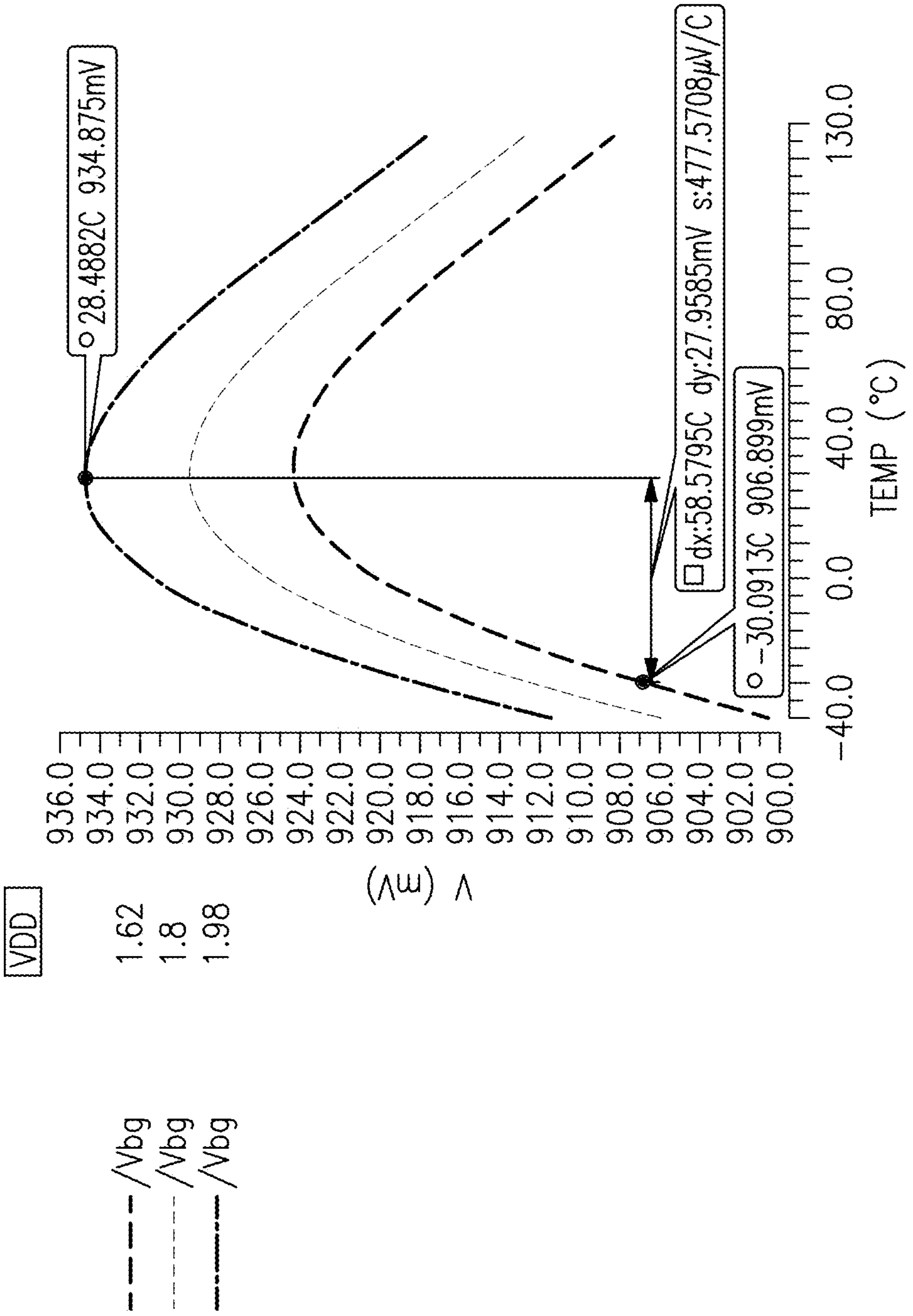
FIG. 8B is one example of a graph of bandgap reference voltage versus temperature for different power supply voltage levels for the coarse bandgap reference circuit of FIG. 8A.
Figure 8C:
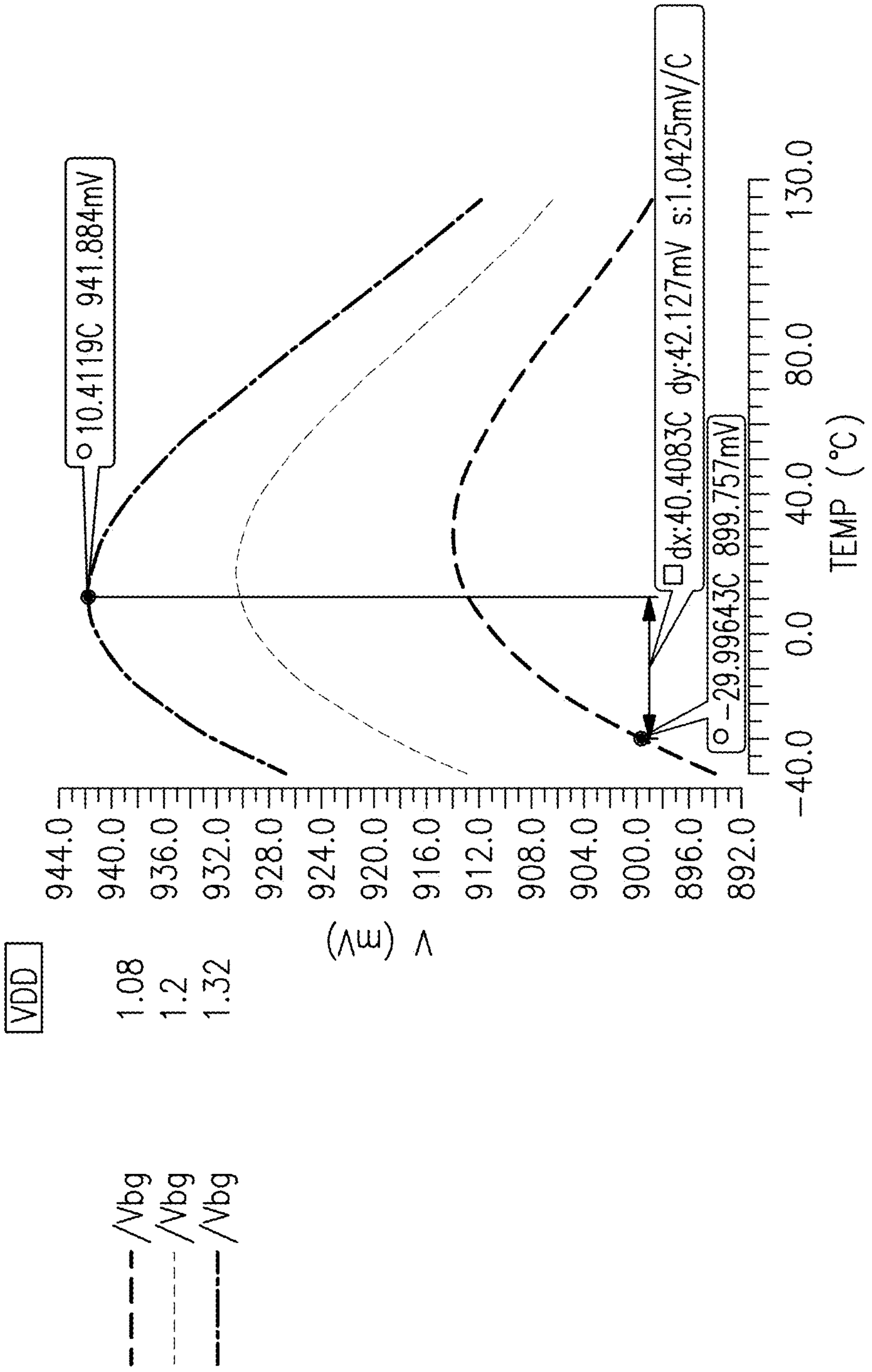
FIG. 8C is another example of a graph of bandgap reference voltage versus temperature for different power supply voltage levels for the coarse bandgap reference circuit of FIG. 8A.

FIG. 8B is one example of a graph of bandgap reference voltage versus temperature for different power supply voltage levels for the coarse bandgap reference circuit 280 of FIG. 8A. FIG. 8C is another example of a graph of bandgap reference voltage versus temperature for different power supply voltage levels for the coarse bandgap reference circuit 280 of FIG. 8A.

In the examples of FIGS. 8B and 8C, the coarse bandgap reference circuit 280 outputs a reference voltage of about 920 mV+/−2.4%.

As shown by a comparison of FIGS. 8B and 8C to FIGS. 6B and 7B, the coarse bandgap reference circuit 280 operates over a wider voltage range than the low voltage bandgap reference circuit 210 and the high voltage bandgap reference circuit 230 individually, but with a poorer temperature coefficient.

Figure 9:
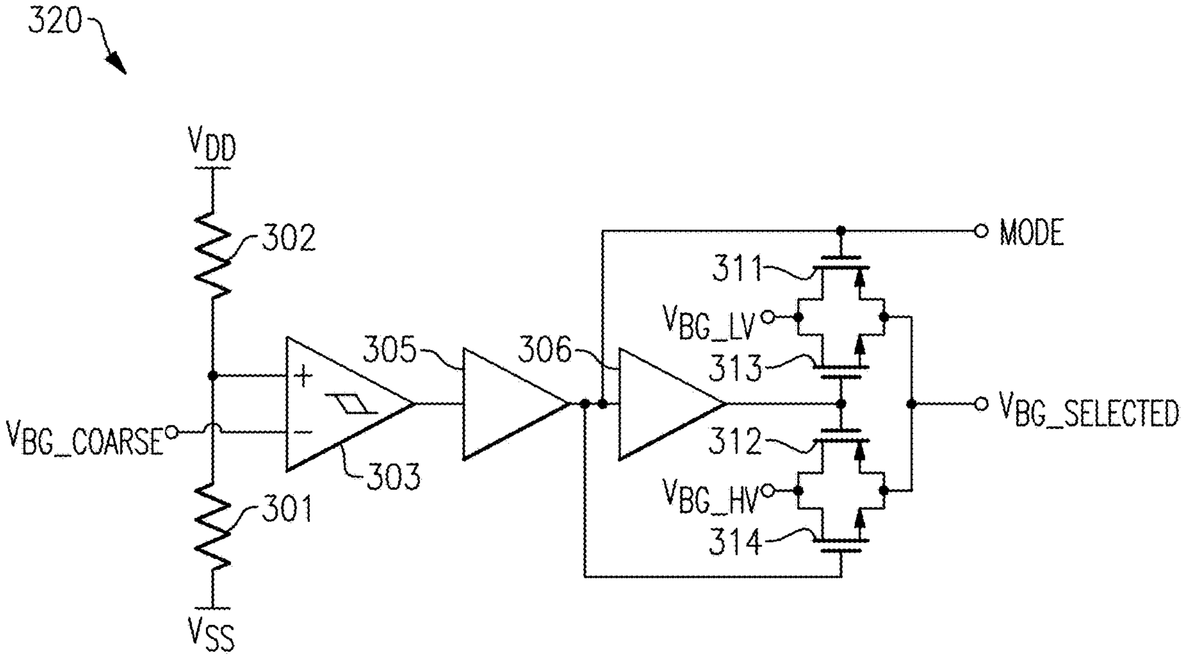
FIG. 9 is a schematic diagram of a bandgap selector circuit according to one embodiment.

FIG. 9 is a schematic diagram of a bandgap selector circuit 320 according to one embodiment. The bandgap selector circuit 320 includes a first voltage divider resistor 301, a second voltage divider resistor 302, a hysteretic comparator 303, a first inverting buffer 305, a second inverting buffer 306, a first pass gate PFET 311, a second pass gate PFET 312, a first pass gate NFET 313, and a second pass gate NFET 314. The bandgap selector circuit 320 receives a power supply voltage $V_{DD}$, a ground voltage $V_{SS}$, a coarse bandgap reference voltage $V_{BG\_COARSE}$, a low voltage bandgap reference voltage $V_{BG\_LV}$, and a high voltage bandgap reference voltage $V_{BG\_HV}$. Additionally, the bandgap selector circuit 320 generates a selected bandgap reference voltage $V_{BG\_SELECTED}$ and a mode signal MODE.

The bandgap selector circuit 320 of FIG. 9 illustrates one embodiment of the bandgap selector circuit 144 of FIG. 5. However, the teachings herein are applicable to bandgap selector circuits implemented in other ways.

In the illustrated embodiment, the first voltage divider resistor 301 and the second voltage divider resistor 302 operate as a voltage divider between the power supply voltage $V_{DD}$ and the ground voltage $V_{SS}$. The ratio $\alpha$ of the voltage divider (corresponding to the ratio of the divided voltage output from the divider to the power supply voltage $V_{DD}$) can be any suitable value, for instance, 0.6.

Additionally, the hysteretic comparator 303 compares the divided voltage from the voltage divider to the coarse bandgap reference voltage $V_{BG\_COARSE}$ to select either the low voltage bandgap reference voltage $V_{BG\_LV}$ or the high voltage bandgap reference voltage $V_{BG\_HV}$ as the selected bandgap reference voltage $V_{BG\_SELECTED}$. Accordingly, the bandgap selector circuit 320 generates the selected bandgap reference voltage $V_{BG\_SELECTED}$ based on comparing the power supply voltage $V_{DD}$ to the coarse bandgap reference voltage $V_{BG\_COARSE}$.

As shown in FIG. 9, the mode signal MODE is used to control the pass gate transistors 311-314, and thus indicates which bandgap reference voltage is selected.

Figure 10A:
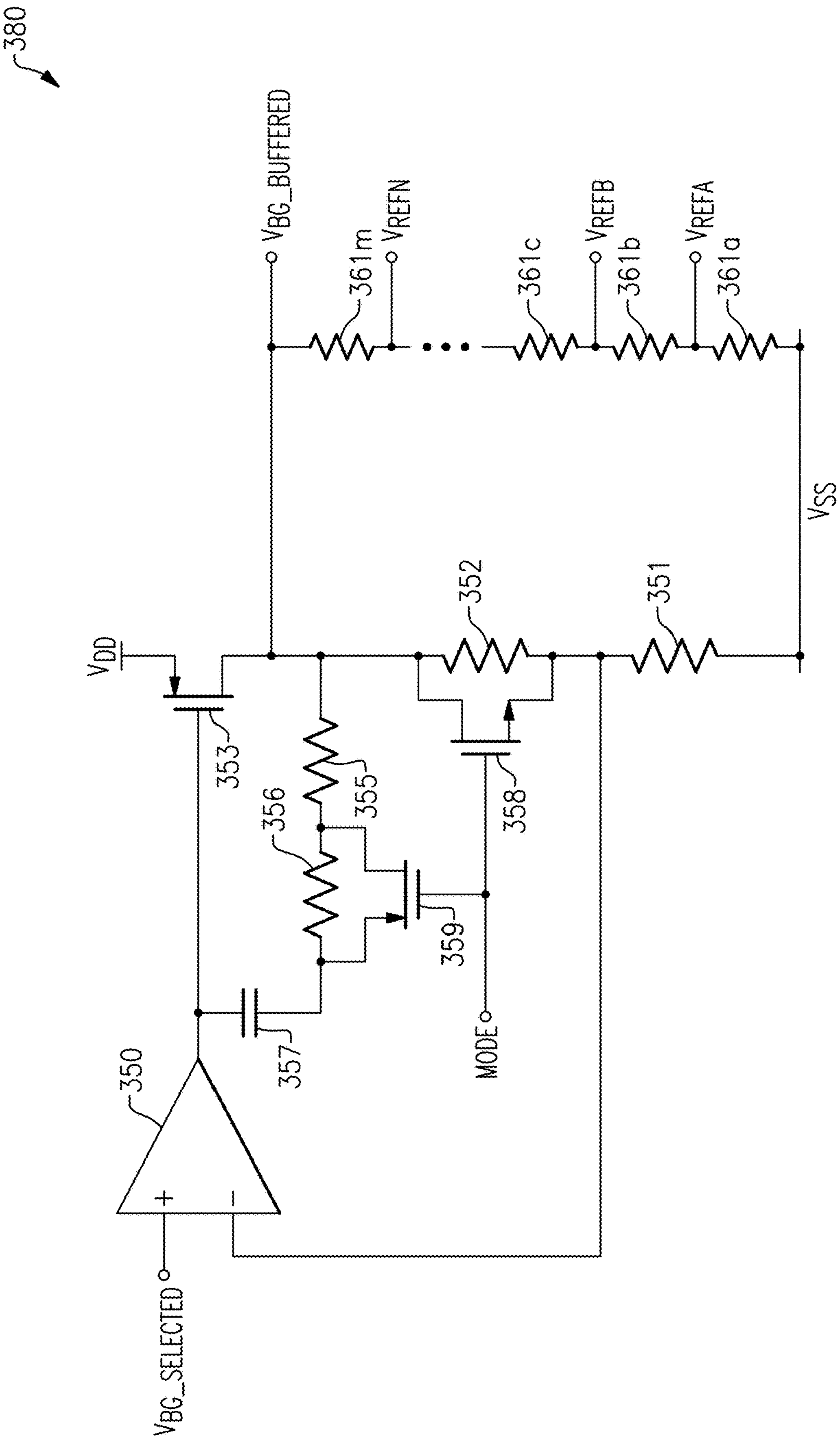
FIG. 10A is a schematic diagram of a bandgap translator circuit according to one embodiment.

FIG. 10A is a schematic diagram of a bandgap translator circuit 380 according to one embodiment. The bandgap translator circuit 380 includes a differential amplifier 350, a first feedback resistor 351, a second feedback resistor 352, a PFET 353, a first compensation resistor 355, a second compensation resistor 356, a compensation capacitor 357, a bypass NFET 358, a bypass PFET 359, and voltage dividing resistors 361*a*, 361*b*, 361*c*, . . . 361*m*. The bandgap translator circuit 380 receives a power supply voltage $V_{DD}$, a ground voltage $V_{SS}$, a mode signal MODE, and a selected bandgap reference voltage $V_{BG\_SELECTED}$. Additionally, the bandgap translator circuit 380 generates a buffered bandgap reference voltage $V_{BG\_BUFFERED}$ and multiple reference voltages $V_{REFA}$, $V_{REFB}$, . . . $V_{REFN}$ that are scaled in relation to the buffered bandgap voltage $V_{BG\_BUFFERED}$ by various scaling factors.

The bandgap translator circuit 380 of FIG. 10A illustrates one embodiment of the bandgap translator circuit 145 of FIG. 5. However, the teachings herein are applicable to bandgap translator circuits implemented in other ways.

In the illustrated embodiment, the bandgap translator circuit 380 operates as a low dropout regulator when the mode signal MODE indicates the low voltage bandgap reference voltage $V_{BG\_LV}$ is selected, and as a unity gain buffer when the mode signal MODE indicates the high voltage bandgap reference voltage $V_{BG\_HV}$ is selected. Thus, when the low voltage bandgap reference voltage $V_{BG\_LV}$ is selected, the buffered bandgap voltage $V_{BG\_BUFFERED}$ is about equal to $V_{BG\_LV}$*(Rfb1+Rfb2)/Rfb1, where Rfb1 and Rfb2 are the resistances of the first feedback resistor 351 and the second feedback resistor 352, respectively.

Implementing the bandgap translator circuit 380 in this manner aids in compensation for a nominal voltage difference between the low voltage bandgap reference voltage $V_{BG\_LV}$ and the high voltage bandgap reference voltage $V_{BG\_HV}$.

In the illustrated embodiment, the mode signal MODE is also used to control an impedance using for frequency compensation, thereby maintaining stability. For example, the second compensation resistor 356 is selectively bypassed based on the mode signal MODE, in this example.

Figure 10B:
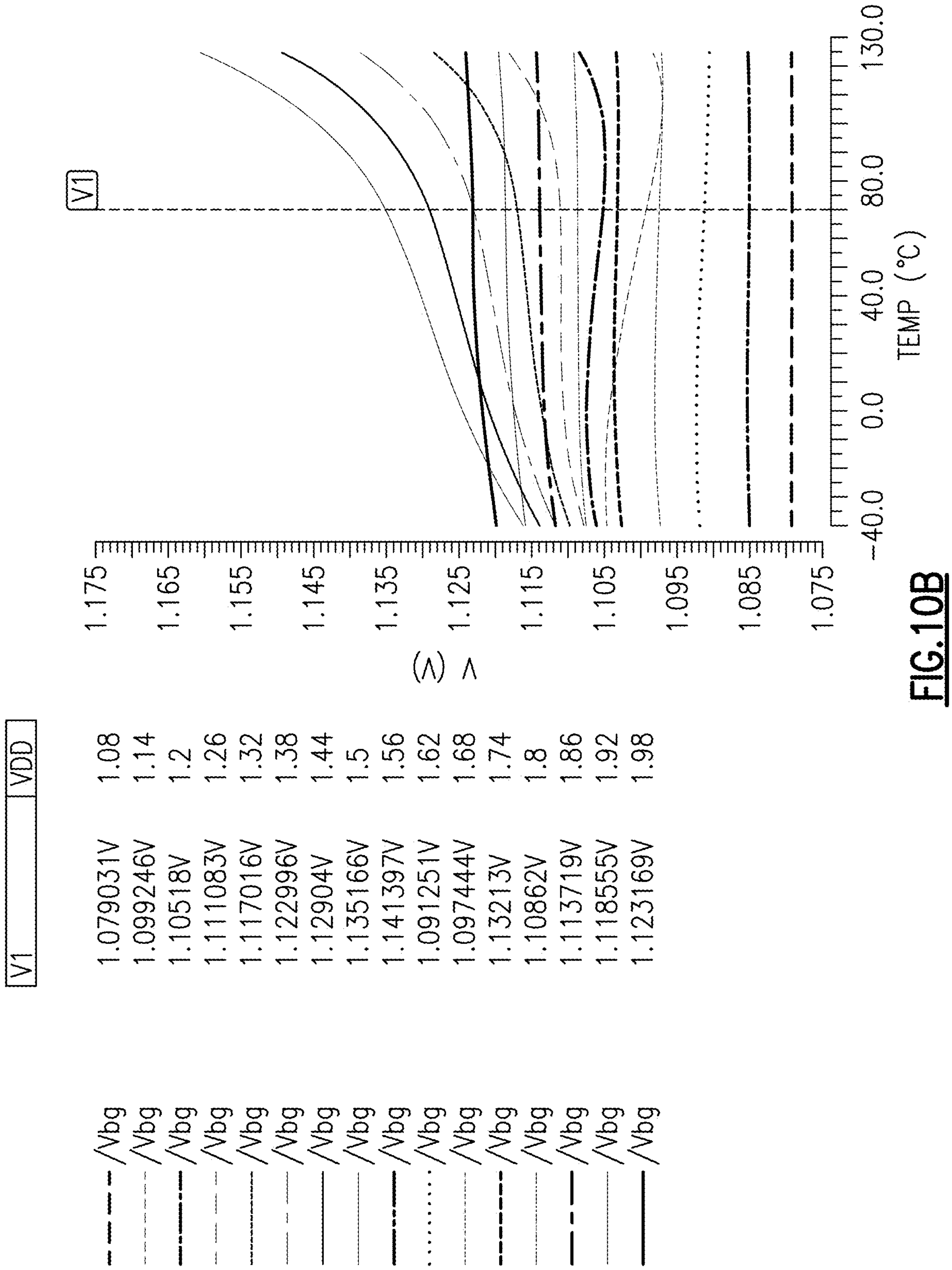
FIG. 10B is one example of a graph of bandgap reference voltage versus temperature for the bandgap translator circuit of FIG. 10A.

FIG. 10B is one example of a graph of bandgap reference voltage versus temperature for the bandgap translator circuit 380 of FIG. 10A. In the example of FIG. 10B, the bandgap translator circuit outputs about 1110 mV for $V_{DD}$ from 1.08V to about 1.98V, thereby covering both low voltage and high voltage domains. The bandgap reference voltage exhibits excellent temperature stability over a temperature range of about −40° C. to about 125° C.

Figure 10C:
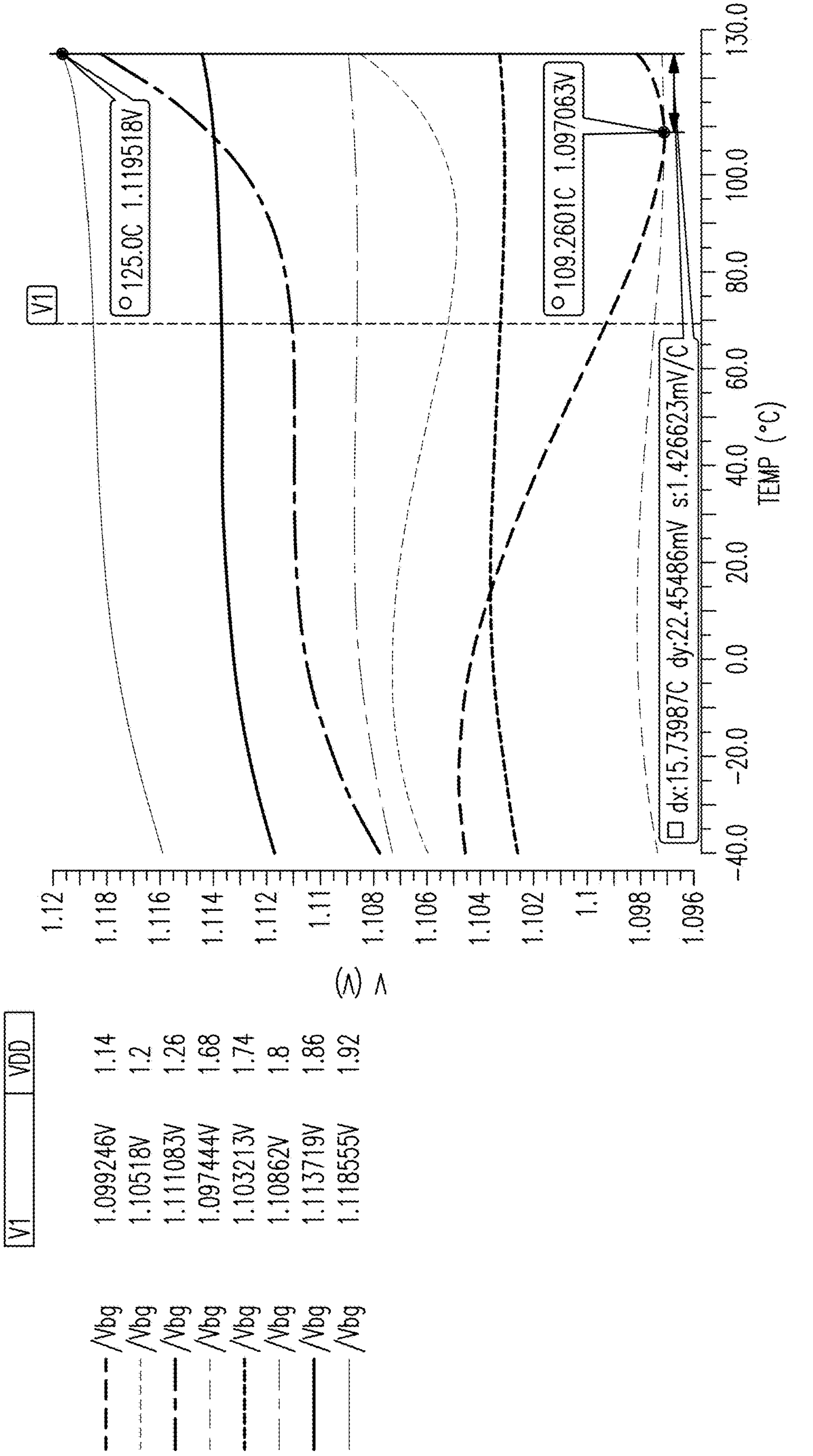
FIG. 10C is an expanded view of a portion of the graph of FIG. 10B.

FIG. 10C is an expanded view of a portion of the graph of FIG. 10B.

Figure 11A:
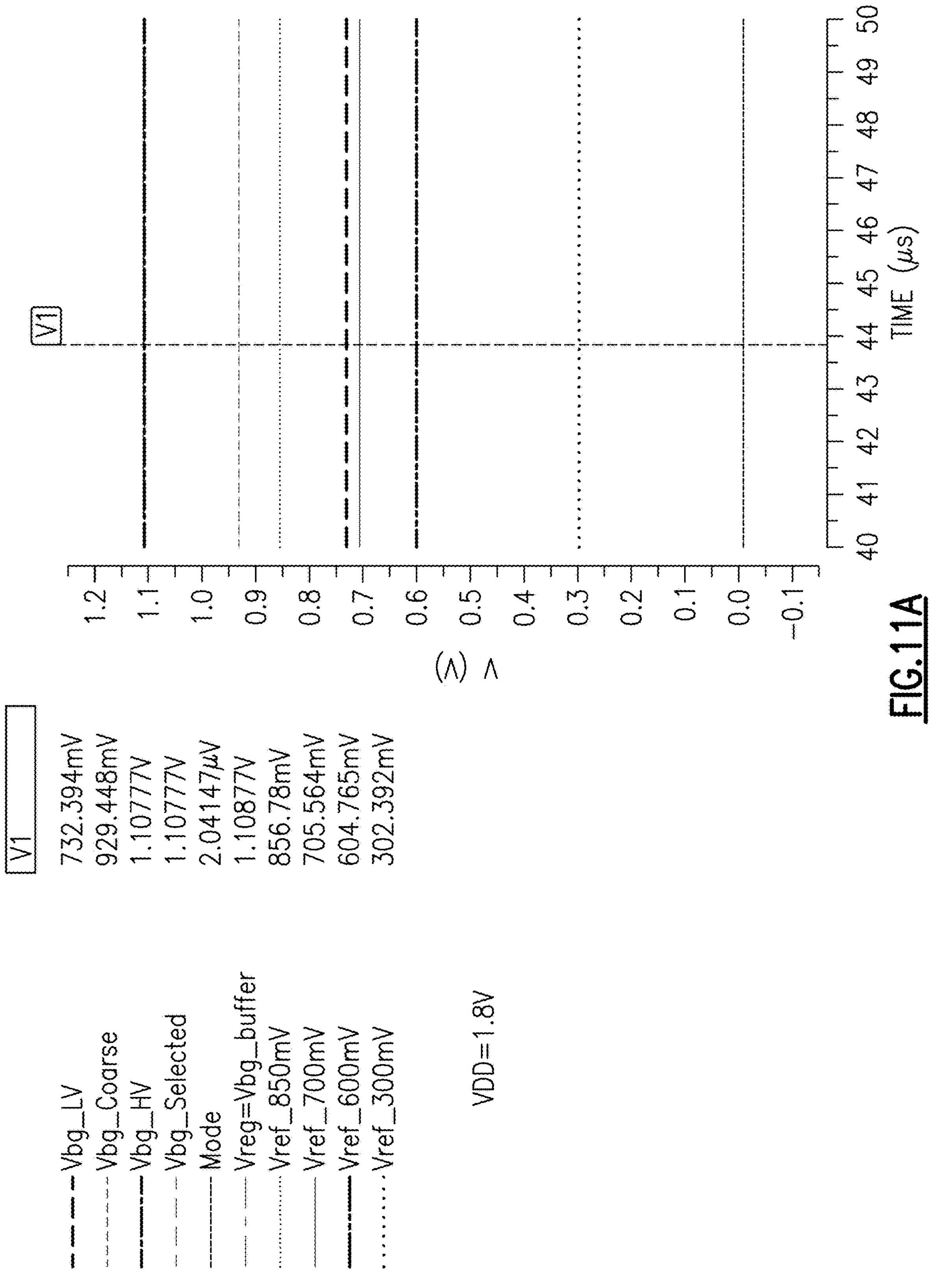
FIG. 11A is one example of a graph of transient simulation results for the multi-domain bandgap reference generator of FIG. 5 at a first supply voltage level.

FIG. 11A is one example of a graph of transient simulation results for the multi-domain bandgap reference generator 150 of FIG. 5 at a supply voltage level of 1.8V.

Figure 11B:
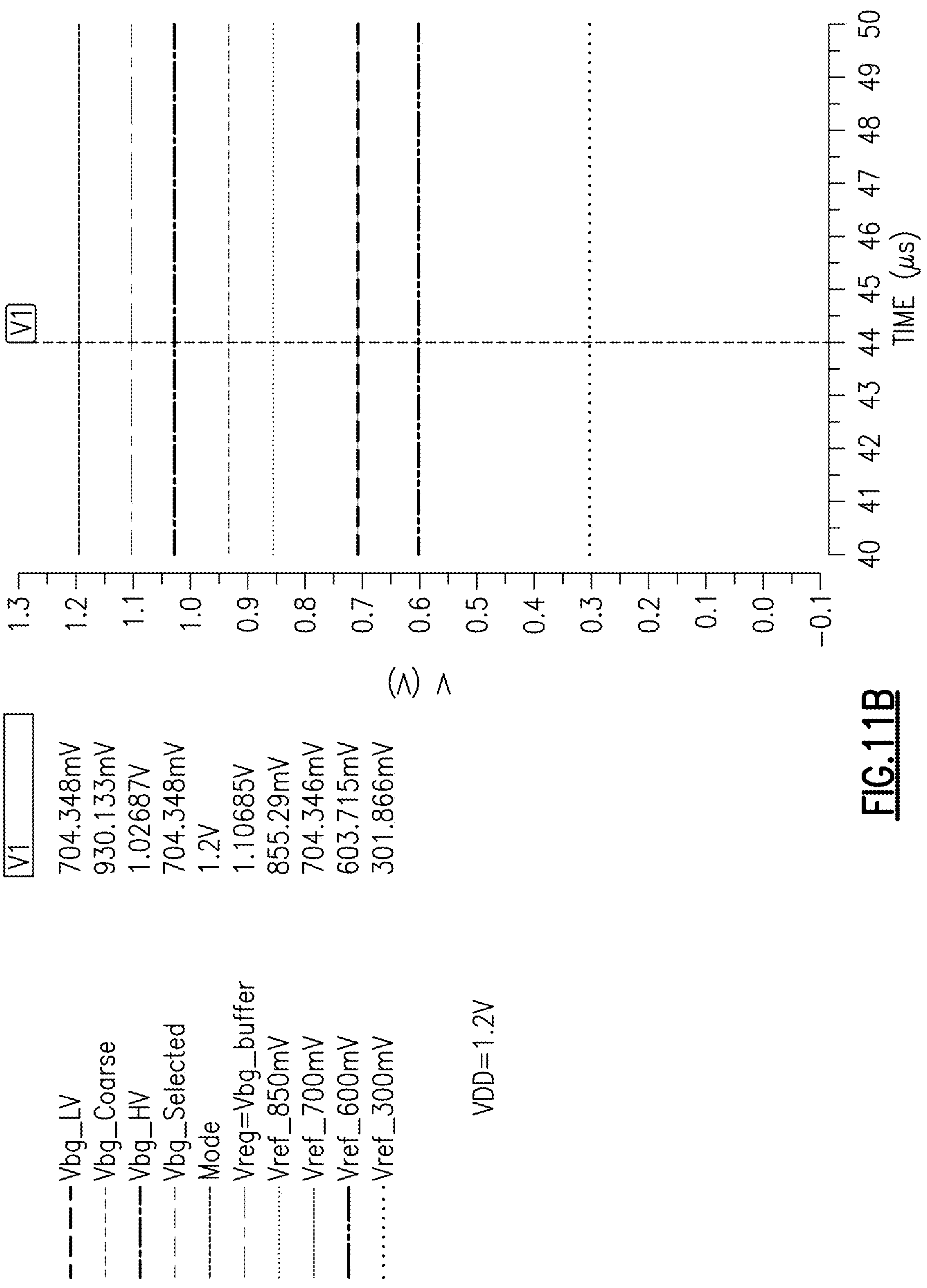
FIG. 11B is one example of a graph of transient simulation results for the multi-domain bandgap reference generator of FIG. 5 at a second supply voltage level.

FIG. 11B is one example of a graph of transient simulation results for the multi-domain bandgap reference generator of FIG. 5 at a supply voltage level of 1.2V.

Figure 12:
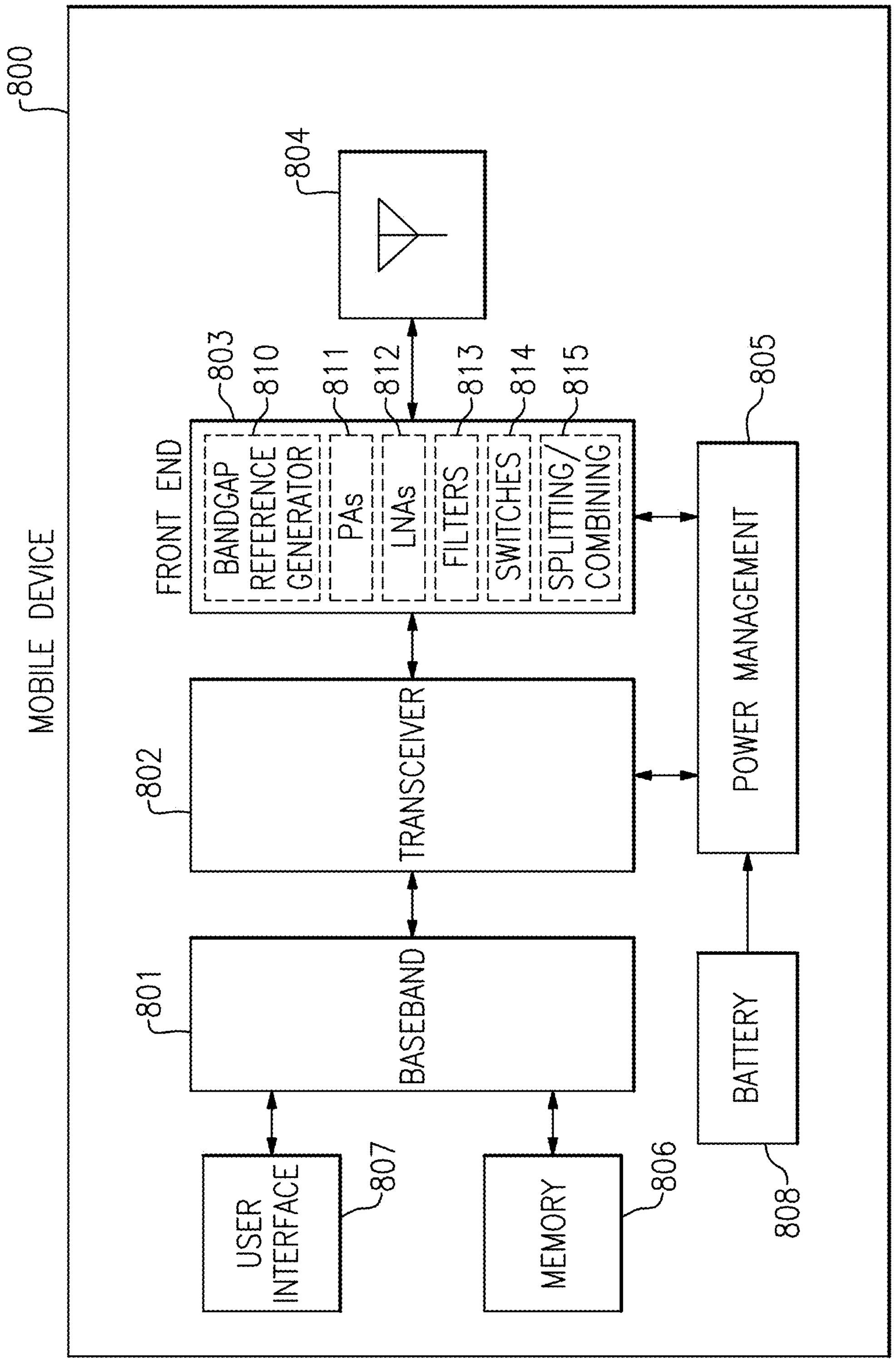
FIG. 12 is a schematic diagram of one embodiment of a mobile device.

FIG. 12 is a schematic diagram of one embodiment of a mobile device 800. The mobile device 800 includes a baseband system 801, a transceiver 802, a front end system 803, antennas 804, a power management system 805, a memory 806, a user interface 807, and a battery 808.

The mobile device 800 can be used communicate using a wide variety of communications technologies, including, but not limited to, 2G, 3G, 4G (including LTE, LTE-Advanced, and LTE-Advanced Pro), 5G NR, WLAN (for instance, WiFi), WPAN (for instance, Bluetooth and ZigBee), WMAN (for instance, WiMax), and/or GPS technologies.

The transceiver 802 generates RF signals for transmission and processes incoming RF signals received from the antennas 804. It will be understood that various functionalities associated with the transmission and receiving of RF signals can be achieved by one or more components that are collectively represented in FIG. 12 as the transceiver 802. In one example, separate components (for instance, separate circuits or dies) can be provided for handling certain types of RF signals.

The front end system 803 aids is conditioning signals transmitted to and/or received from the antennas 804. In the illustrated embodiment, the front end system 803 includes a bandgap reference generator 810, power amplifiers (PAs) 811, low noise amplifiers (LNAs) 812, filters 813, switches 814, and signal splitting/combining circuitry 815. However, other implementations are possible.

For example, the front end system 803 can provide a number of functionalities, including, but not limited to, amplifying signals for transmission, amplifying received signals, filtering signals, switching between different bands, switching between different power modes, switching between transmission and receiving modes, duplexing of signals, multiplexing of signals (for instance, diplexing or triplexing), or some combination thereof.

The mobile device system 800 illustrates one example application of a bandgap reference generator implemented in accordance with the teachings herein. However, the bandgap reference generators herein can be used in a wide variety of applications.

In certain implementations, the mobile device 800 supports carrier aggregation, thereby providing flexibility to increase peak data rates. Carrier aggregation can be used for both Frequency Division Duplexing (FDD) and Time Division Duplexing (TDD), and may be used to aggregate a plurality of carriers or channels. Carrier aggregation includes contiguous aggregation, in which contiguous carriers within the same operating frequency band are aggregated. Carrier aggregation can also be non-contiguous, and can include carriers separated in frequency within a common band or in different bands.

The antennas 804 can include antennas used for a wide variety of types of communications. For example, the antennas 804 can include antennas for transmitting and/or receiving signals associated with a wide variety of frequencies and communications standards.

In certain implementations, the antennas 804 support MIMO communications and/or switched diversity communications. For example, MIMO communications use multiple antennas for communicating multiple data streams over a single radio frequency channel. MIMO communications benefit from higher signal to noise ratio, improved coding, and/or reduced signal interference due to spatial multiplexing differences of the radio environment. Switched diversity refers to communications in which a particular antenna is selected for operation at a particular time. For example, a switch can be used to select a particular antenna from a group of antennas based on a variety of factors, such as an observed bit error rate and/or a signal strength indicator.

The mobile device 800 can operate with beamforming in certain implementations. For example, the front end system 803 can include amplifiers having controllable gain and phase shifters having controllable phase to provide beam formation and directivity for transmission and/or reception of signals using the antennas 804. For example, in the context of signal transmission, the amplitude and phases of the transmit signals provided to the antennas 804 are controlled such that radiated signals from the antennas 804 combine using constructive and destructive interference to generate an aggregate transmit signal exhibiting beam-like qualities with more signal strength propagating in a given direction. In the context of signal reception, the amplitude and phases are controlled such that more signal energy is received when the signal is arriving to the antennas 804 from a particular direction. In certain implementations, the antennas 804 include one or more arrays of antenna elements to enhance beamforming.

The baseband system 801 is coupled to the user interface 807 to facilitate processing of various user input and output (I/O), such as voice and data. The baseband system 801 provides the transceiver 802 with digital representations of transmit signals, which the transceiver 802 processes to generate RF signals for transmission. The baseband system 801 also processes digital representations of received signals provided by the transceiver 802. As shown in FIG. 12, the baseband system 801 is coupled to the memory 806 of facilitate operation of the mobile device 800.

The memory 806 can be used for a wide variety of purposes, such as storing data and/or instructions to facilitate the operation of the mobile device 800 and/or to provide storage of user information.

The power management system 805 provides a number of power management functions of the mobile device 800. In certain implementations, the power management system 805 includes a PA supply control circuit that controls the supply voltages of the power amplifiers 811. For example, the power management system 805 can be configured to change the supply voltage(s) provided to one or more of the power amplifiers 811 to improve efficiency, such as power added efficiency (PAE).

As shown in FIG. 12, the power management system 805 receives a battery voltage from the battery 808. The battery 808 can be any suitable battery for use in the mobile device 800, including, for example, a lithium-ion battery.

Figure 13:
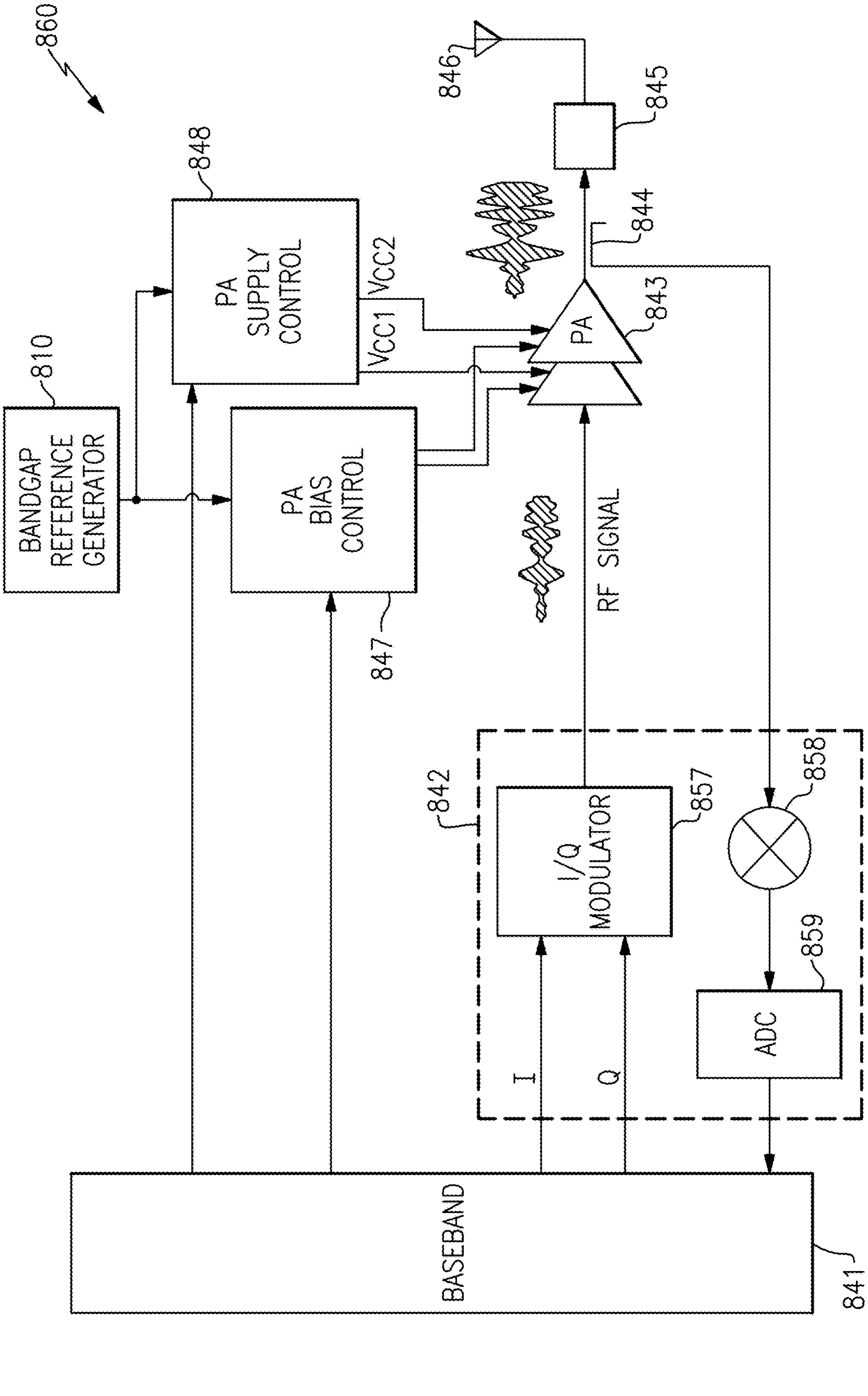
FIG. 13 is a schematic diagram of a power amplifier system according to one embodiment.

FIG. 13 is a schematic diagram of a power amplifier system 860 according to one embodiment. The illustrated power amplifier system 860 includes a bandgap reference generator 810, a baseband processor 841, a transmitter/observation receiver 842, a power amplifier (PA) 843, a directional coupler 844, front-end circuitry 845, an antenna 846, a PA bias control circuit 847, and a PA supply control circuit 848. The transmitter/observation receiver 842 includes an I/Q modulator 857, a mixer 858, and an analog-to-digital converter (ADC) 859. In certain implementations, the transmitter/observation receiver 842 is incorporated into a transceiver.

The baseband processor 841 can be used to generate an in-phase (I) signal and a quadrature-phase (Q) signal, which can be used to represent a sinusoidal wave or signal of a desired amplitude, frequency, and phase. For example, the I signal can be used to represent an in-phase component of the sinusoidal wave and the Q signal can be used to represent a quadrature-phase component of the sinusoidal wave, which can be an equivalent representation of the sinusoidal wave. In certain implementations, the I and Q signals can be provided to the I/Q modulator 857 in a digital format. The baseband processor 841 can be any suitable processor configured to process a baseband signal. For instance, the baseband processor 841 can include a digital signal processor, a microprocessor, a programmable core, or any combination thereof. Moreover, in some implementations, two or more baseband processors 841 can be included in the power amplifier system 860.

The I/Q modulator 857 can be configured to receive the I and Q signals from the baseband processor 841 and to process the I and Q signals to generate an RF signal. For example, the I/Q modulator 857 can include digital-to-analog converters (DACs) configured to convert the I and Q signals into an analog format, mixers for upconverting the I and Q signals to RF, and a signal combiner for combining the upconverted I and Q signals into an RF signal suitable for amplification by the power amplifier 843. In certain implementations, the I/Q modulator 857 can include one or more filters configured to filter frequency content of signals processed therein.

The power amplifier 843 can receive the RF signal from the I/Q modulator 857, and when enabled can provide an amplified RF signal to the antenna 846 via the front-end circuitry 845.

The front-end circuitry 845 can be implemented in a wide variety of ways. In one example, the front-end circuitry 845 includes one or more switches, filters, duplexers, multiplexers, and/or other components. In another example, the front-end circuitry 845 is omitted in favor of the power amplifier 843 providing the amplified RF signal directly to the antenna 846.

The directional coupler 844 senses an output signal of the power amplifier 823. Additionally, the sensed output signal from the directional coupler 844 is provided to the mixer 858, which multiplies the sensed output signal by a reference signal of a controlled frequency. The mixer 858 operates to generate a downshifted signal by downshifting the sensed output signal's frequency content. The downshifted signal can be provided to the ADC 859, which can convert the downshifted signal to a digital format suitable for processing by the baseband processor 841. Including a feedback path from the output of the power amplifier 843 to the baseband processor 841 can provide a number of advantages. For example, implementing the baseband processor 841 in this manner can aid in providing power control, compensating for transmitter impairments, and/or in performing digital pre-distortion (DPD). Although one example of a sensing path for a power amplifier is shown, other implementations are possible.

The PA supply control circuit 848 receives a power control signal from the baseband processor 841, and controls supply voltages of the power amplifier 843. In the illustrated configuration, the PA supply control circuit 848 generates a first supply voltage $V_{CC1}$ for powering an input stage of the power amplifier 843 and a second supply voltage $V_{CC2}$ for powering an output stage of the power amplifier 843. The PA supply control circuit 848 can control the voltage level of the first supply voltage $V_{CC1}$ and/or the second supply voltage $V_{CC2}$ to enhance the power amplifier system's PAE.

The PA supply control circuit 848 can employ various power management techniques to change the voltage level of one or more of the supply voltages over time to improve the power amplifier's power added efficiency (PAE), thereby reducing power dissipation.

One technique for improving efficiency of a power amplifier is average power tracking (APT), in which a DC-to-DC converter is used to generate a supply voltage for a power amplifier based on the power amplifier's average output power. Another technique for improving efficiency of a power amplifier is envelope tracking (ET), in which a supply voltage of the power amplifier is controlled in relation to the envelope of the RF signal. Thus, when a voltage level of the envelope of the RF signal increases the voltage level of the power amplifier's supply voltage can be increased. Likewise, when the voltage level of the envelope of the RF signal decreases the voltage level of the power amplifier's supply voltage can be decreased to reduce power consumption.

In certain configurations, the PA supply control circuit 848 is a multi-mode supply control circuit that can operate in multiple supply control modes including an APT mode and an ET mode. For example, the power control signal from the baseband processor 841 can instruct the PA supply control circuit 848 to operate in a particular supply control mode.

As shown in FIG. 13, the PA bias control circuit 847 receives a bias control signal from the baseband processor 841, and generates bias control signals for the power amplifier 843. In the illustrated configuration, the bias control circuit 847 generates bias control signals for both an input stage of the power amplifier 843 and an output stage of the power amplifier 843. However, other implementations are possible.

In the illustrated embodiment, the bandgap reference generator 810 serves to generate one or more reference voltages for the PA bias control circuit 847 and/or the PA supply control circuit 848, thereby aiding in biasing and/or powering the power amplifier 843.

The power amplifier system 860 illustrates another example application of a bandgap reference generator implemented in accordance with the teachings herein. However, the bandgap reference generators herein can be used in a wide variety of applications.

Figure 14A:
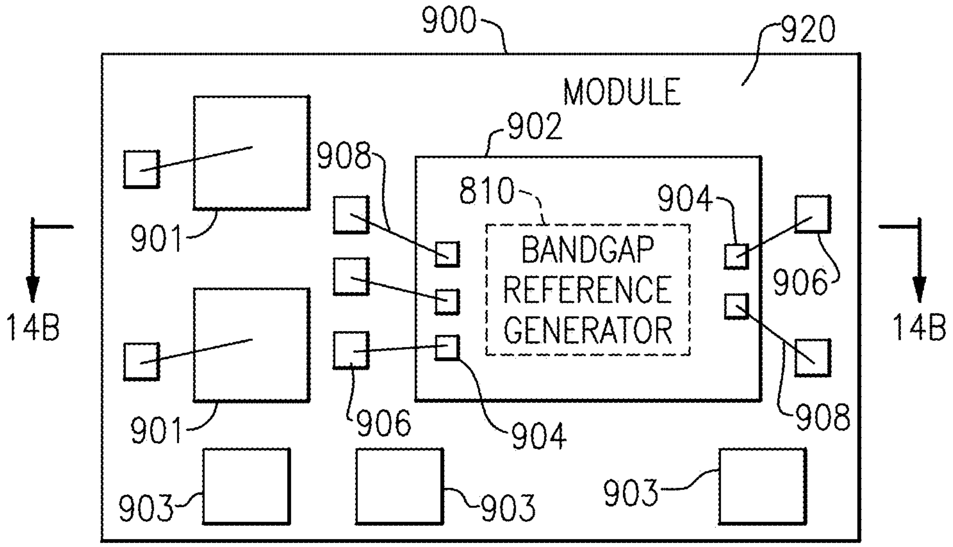
FIG. 14A is a schematic diagram of one embodiment of a packaged module.
Figure 14B:
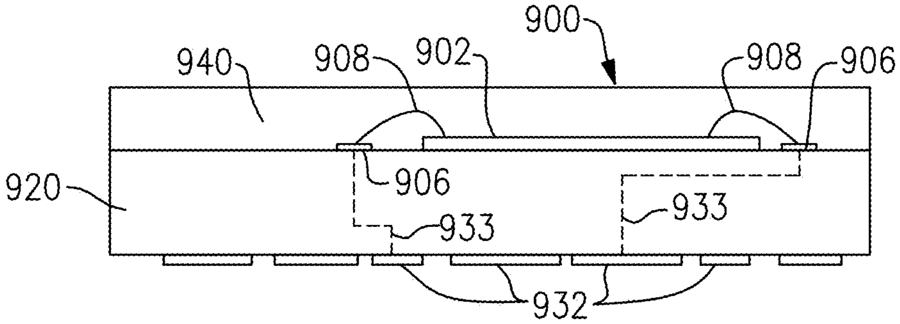
FIG. 14B is a schematic diagram of a cross-section of the packaged module of FIG. 14A taken along the lines 14B-14B.

FIG. 14A is a schematic diagram of one embodiment of a packaged module 900. FIG. 14B is a schematic diagram of a cross-section of the packaged module 900 of FIG. 14A taken along the lines 14B-14B.

The packaged module 900 includes radio frequency components 901, a semiconductor die 902, surface mount devices 903, wirebonds 908, a package substrate 920, and an encapsulation structure 940. The package substrate 920 includes pads 906 formed from conductors disposed therein. Additionally, the semiconductor die 902 includes pins or pads 904, and the wirebonds 908 have been used to connect the pads 904 of the die 902 to the pads 906 of the package substrate 920.

The semiconductor die 902 includes a bandgap reference generator 810 implemented in accordance with one or more features disclosed herein.

The packaging substrate 920 can be configured to receive a plurality of components such as radio frequency components 901, the semiconductor die 902 and the surface mount devices 903, which can include, for example, surface mount capacitors and/or inductors. In one implementation, the radio frequency components 901 include integrated passive devices (IPDs).

As shown in FIG. 14B, the packaged module 900 is shown to include a plurality of contact pads 932 disposed on the side of the packaged module 900 opposite the side used to mount the semiconductor die 902. Configuring the packaged module 900 in this manner can aid in connecting the packaged module 900 to a circuit board, such as a phone board of a mobile device. The example contact pads 932 can be configured to provide radio frequency signals, bias signals, and/or power (for example, a power supply voltage and ground) to the semiconductor die 902 and/or other components. As shown in FIG. 14B, the electrical connections between the contact pads 932 and the semiconductor die 902 can be facilitated by connections 933 through the package substrate 920. The connections 933 can represent electrical paths formed through the package substrate 920, such as connections associated with vias and conductors of a multilayer laminated package substrate.

In some embodiments, the packaged module 900 can also include one or more packaging structures to, for example, provide protection and/or facilitate handling. Such a packaging structure can include overmold or encapsulation structure 940 formed over the packaging substrate 920 and the components and die(s) disposed thereon.

It will be understood that although the packaged module 900 is described in the context of electrical connections based on wirebonds, one or more features of the present disclosure can also be implemented in other packaging configurations, including, for example, flip-chip configurations.

Applications

Some of the embodiments described above have provided examples of bandgap reference generation in connection with wireless communications devices. However, the principles and advantages of the embodiments can be used for any other systems or apparatus that benefit from any of the circuits and systems described herein.

For example, bandgap reference generators can be included in various electronic devices, including, but not limited to consumer electronic products, parts of the consumer electronic products, electronic test equipment, etc. Example electronic devices include, but are not limited to, a base station, a wireless network access point, a mobile phone (for instance, a smartphone), a tablet, a television, a computer monitor, a computer, a hand-held computer, a personal digital assistant (PDA), a microwave, a refrigerator, an automobile, a stereo system, a disc player, a digital camera, a portable memory chip, a washer, a dryer, a copier, a facsimile machine, a scanner, a multi-functional peripheral device, a wrist watch, a clock, etc. Further, the electronic devices can include unfinished products.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "may," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A bandgap reference generator comprising:

a low voltage bandgap reference circuit configured to generate a first bandgap reference voltage over a first range of a power supply voltage;

a high voltage bandgap reference circuit configured to generate a second bandgap reference voltage over a second range of the power supply voltage that is greater than the first range;

a bandgap selector circuit configured to output a selected bandgap reference voltage by selecting the first bandgap reference voltage or the second bandgap reference voltage based on a voltage level of the power supply voltage;

a bandgap translator circuit configured to generate a buffered bandgap reference voltage based on the selected bandgap reference voltage; and a coarse bandgap reference circuit configured to generate a third bandgap reference voltage, the bandgap selector circuit further configured to compare the voltage level of the power supply voltage to the third bandgap reference voltage.

2. The bandgap reference generator of claim 1 wherein the coarse bandgap reference circuit operates over a third range of the power supply voltage that includes the first range and the second range.

3. The bandgap reference generator of claim 1 wherein the third bandgap reference voltage is of a lower precision than the first bandgap reference voltage and the second bandgap reference voltage.

4. The bandgap reference generator of claim 1 wherein the bandgap translator circuit is further configured to output a plurality of reference voltages by scaling the buffered bandgap reference voltage by a plurality of different scaling factors.

5. The bandgap reference generator of claim 1 wherein the bandgap translator circuit is further configured to generate the buffered bandgap reference voltage to compensate for a nominal voltage difference between the first bandgap reference voltage and the second bandgap reference voltage.

6. The bandgap reference generator of claim 1 wherein the bandgap selector circuit is further configured to provide the bandgap translator circuit with a mode signal indicating the selected bandgap reference voltage.

7. The bandgap reference generator of claim 6 wherein the bandgap translator circuit includes a differential amplifier operable to control a transistor by way of a feedback loop, the mode signal operable to control an impedance of a compensation circuit to maintain stability of the feedback loop.

8. The bandgap reference generator of claim 6 wherein the bandgap translator circuit is configured to operate as a low dropout regulator in a first state of the mode signal, and to operate as a unity gain buffer in a second state of the mode signal.

9. A method of bandgap voltage generation, the method comprising:

generating a first bandgap reference voltage over a first range of a power supply voltage using a low voltage bandgap reference circuit;

generating a second bandgap reference voltage over a second range of the power supply voltage using a high voltage bandgap reference circuit, the second range greater than the first range;

outputting a selected bandgap reference voltage by selecting the first bandgap reference voltage or the second bandgap reference voltage based on a voltage level of the power supply voltage using a bandgap selector circuit;

generating a buffered bandgap reference voltage based on the selected bandgap reference voltage using a bandgap translator circuit;

generating a third bandgap reference voltage using a coarse bandgap reference circuit; and comparing the voltage level of the power supply voltage to the third bandgap reference voltage using the bandgap selector circuit.

10. The method of claim 9 further comprising scaling the buffered bandgap reference voltage to generate a plurality of reference voltages using the bandgap translator circuit.

11. The method of claim 9 further comprising compensating the buffered bandgap reference voltage for a nominal voltage difference between the first bandgap reference voltage and the second bandgap reference voltage using the bandgap translator circuit.

12. The method of claim 9 further comprising generating a mode signal indicating the selected bandgap reference voltage using the bandgap selector circuit, and providing the mode signal to the bandgap translator circuit.

13. The method of claim 12 further comprising processing the mode signal to maintain stability of a feedback loop of the bandgap translator circuit.

14. The method of claim 12 further comprising operating the bandgap translator circuit as a low dropout regulator in a first state of the mode signal, and as a unity gain buffer in a second state of the mode signal.

15. The method of claim 9 wherein the coarse bandgap reference circuit operates over a third range of the power supply voltage that includes the first range and the second range.

16. A front end module comprising:

a package substrate; and a semiconductor die attached to the package substrate, the semiconductor die including a low voltage bandgap reference circuit configured to generate a first bandgap reference voltage over a first range of a power supply voltage, a high voltage bandgap reference circuit configured to generate a second bandgap reference voltage over a second range of the power supply voltage that is greater than the first range, a bandgap selector circuit configured to output a selected bandgap reference voltage by selecting the first bandgap reference voltage or the second bandgap reference voltage based on a voltage level of the power supply voltage, a bandgap translator circuit configured to generate a buffered bandgap reference voltage based on the selected bandgap reference voltage, and a coarse bandgap reference circuit configured to generate a third bandgap reference voltage, the bandgap selector circuit further configured to compare the voltage level of the power supply voltage to the third bandgap reference voltage.

17. The front end module of claim 16 wherein the bandgap selector circuit is further configured to provide the bandgap translator circuit with a mode signal indicating the selected bandgap reference voltage.

18. The front end module of claim 17 wherein the bandgap translator circuit is configured to operate as a low dropout regulator in a first state of the mode signal, and to operate as a unity gain buffer in a second state of the mode signal.

19. The front end module of claim 16 wherein the coarse bandgap reference circuit operates over a third range of the power supply voltage that includes the first range and the second range.

20. The front end module of claim 16 wherein the third bandgap reference voltage is of a lower precision than the first bandgap reference voltage and the second bandgap reference voltage.

* * * * *